United States Patent
Miyazaki et al.

(10) Patent No.: US 6,691,588 B2
(45) Date of Patent: Feb. 17, 2004

(54) SHIFTING DEVICE FOR SYNCHROMESH-TYPE TRANSMISSION

(75) Inventors: Takeshige Miyazaki, Anjo (JP); Ryuji Choshi, Aichi-ken (JP); Yoshiyuki Aoyama, Nishio (JP); Mitsutoshi Kamiya, Kariya (JP); Yoshihiro Ichikawa, Gifu (JP)

(73) Assignee: Aisin AI Co., Ltd., Nishio (JP)

( * ) Notice: Subject to any disclaimer, the term of this patent is extended or adjusted under 35 U.S.C. 154(b) by 48 days.

(21) Appl. No.: 09/974,894

(22) Filed: Oct. 12, 2001

(65) Prior Publication Data

US 2002/0043119 A1 Apr. 18, 2002

(30) Foreign Application Priority Data

Oct. 13, 2000 (JP) ......................................... 2000-313010

(51) Int. Cl.[7] ............................................... F16H 61/08
(52) U.S. Cl. ...................... 74/336 R; 701/59
(58) Field of Search ............................. 74/335, 336 R; 701/58, 59, 61

(56) References Cited

U.S. PATENT DOCUMENTS 6,164,149 A * 12/2000 Ohmori et al. ........... 74/336 R
6,393,928 B1 * 5/2002 Watanabe ................. 74/336 R
6,470,765 B1 * 10/2002 Fukuda .................... 74/336 R
2002/0053248 A1 * 5/2002 Yamamoto ................ 74/336 R

FOREIGN PATENT DOCUMENTS

JP  2000-46176 A  2/2000

* cited by examiner

Primary Examiner—Ankur Parekh
(74) Attorney, Agent, or Firm—Burns, Doane, Swecker & Mathis, LLP

(57) ABSTRACT

In a shifting device which changes the gear ratio of a synchromesh-type transmission by using an electrically operated or controlled actuator, the actuator is controlled to stabilize or equalize the time durations required for effecting respective synchronizations. A driving signal for each of the synchronization controls is decided in accordance with a relationship between the driving signal to be applied to the actuator and a relative rotation number between an idle gear and a sleeve when the synchronization control is initiated. Prior to each synchronization control, the above relation is corrected based on four variables obtained at the latest synchronization control, including (i) an input rotation number deviation summation $\Sigma \Delta Nin$, (ii) a synchronization time duration deviation $\Delta T_{SYN}$, (iii) an elapse-time input rotation number deviation $\Delta dNin^P$, and (iv) a change grade deviation $\Delta dNin$.

12 Claims, 19 Drawing Sheets

Corresponding shift fork

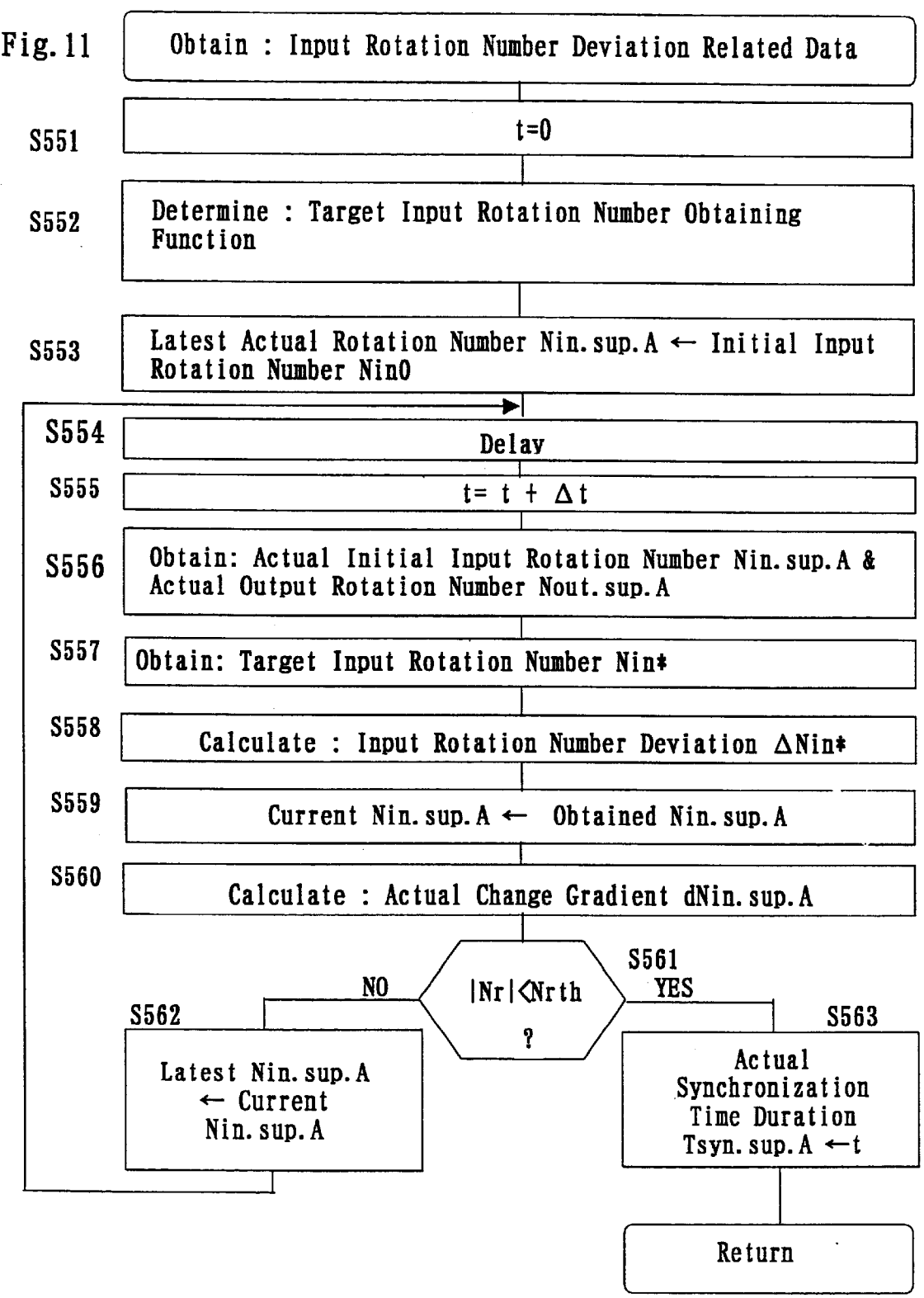

Fig. 12

Correction Making Routine

- S601 — Calculate: Summation Of Input Rotation Number Deviation $\Sigma \Delta Nin$

- S602 — Determine: 1st Temporal Correction Coefficient $C^{T.1}$ based on $\Sigma \Delta Nin$

- S603 — Calculate: Synchronization Time Duration Deviation $\Delta Tsyn$

- S604 — Determine: 2nd Temporal Correction Coefficient $C^{T.2}$ based on $\Delta Tsyn$

- S605 — Obtain: Elapsed Time Input Rotation Number Deviation $\Delta Nin^{P}$

- S606 — Determine: 3rd Temporal Correction Coefficient $C^{T.3}$ based on $\Delta Nin^{P}$

- S607 — Calculate: Change Gradient Deviation $\Delta dNin$

- S608 — Determine: 4th Temporal Correction Coefficient $C^{T.4}$ based on $\Delta dNin$

- S609 — Ultimate Correction Coefficient $C^{F} \leftarrow \sum_{i} C^{T.i} \omega$

- S610 — Read: Initial Relative Rotation Number $Nr0$

- S611 — Correct: Driving Signal Decision Map Based On Ultimate Correction Coefficient $C^{F}$ Return

SHIFTING DEVICE FOR SYNCHROMESH-TYPE TRANSMISSION

This application is based on and claims priority under 35 U.S.C. §119 with respect to Japanese Application No. 2000-313010 filed on Oct. 13, 2000, the entire content of which is incorporated herein by reference.

FIELD OF THE INVENTION

The present invention is generally directed to a synchromesh-type transmission of a vehicle. More particularly, the present invention pertains to an actuator control for a shifting device in a synchromesh-type vehicle transmission.

BACKGROUND OF THE INVENTION

One known type of vehicle transmission is a synchromesh-type transmission which transmits a rotation from a source of power to the driving wheels in an automotive vehicle. In this type of transmission, the power transmission path extending from the source of power to each of the driving wheels includes no sliding parts or components. Thus, unlike automatic transmissions, synchromesh-type transmissions have the advantage that a highly responsive driving feeling can be obtained resulting from a relatively quick response of the driving wheels when the driver depresses the acceleration pedal. In addition, fuel or gas consumption can be reduced, thus contributing to energy savings.

To make the driver's gear shift or changing gear ratio much easier than that in the conventional fully manually operated transmission, while also enjoying the above-mentioned advantages, techniques have been developed for changing the gear ratio of a synchromesh type transmission through operation of an electrically controlled actuator. One example is disclosed in Japanese Unexamined Patent Publication No. 2000-46176.

The transmission which is in association with a shifting device of the kind includes a synchromesh mechanism in which one of a plurality of continually meshed gear pairs of different gear ratios is selected as a valid gear pair.

The synchromesh mechanism includes a sleeve and a synchronizer ring. The sleeve is rotatable together with the shaft and is movable in the axial direction of the shaft on which one of the gear pair is mounted as an idle gear, which is free to rotate relative to the shaft. The synchronizer ring is free to rotate and move in an axial direction relative to the idle gear.

When the synchromesh mechanism is made active, synchronization is established between the idle gear and the sleeve by moving the sleeve in the axial direction to engage the synchronizer ring to thereby causing the synchronizer ring to push on a frictional surface which is incapable of rotating relative to the idle gear and a balk is established until the synchronization is completed which prevents a clutch which is incapable of rotating relative to the sleeve from being engaged with another clutch which is incapable of rotating relative to the idle gear.

The above-mentioned shifting device includes an actuator and a control device, with the actuator being controlled electrically in response to an external signal to generate a load for moving the sleeve in the axial direction. The control device feeds a driving signal to the actuator to change the gear ratio of the transmission on the basis of the driver's intention and the state of the vehicle.

The shifting device should preferably be designed to change the gear ratio of the transmission without an improper feeling. To address this need, it is desirable to control the synchronization time duration as the time passing duration ranging from initiation to termination of each synchronization operation in the transmission in such a manner that actual synchronization time durations are made stable or equalized when plural synchronization operations are performed.

SUMMARY OF THE INVENTION

The present invention provides an improved shifting device associated with a synchromesh-type transmission for changing the gear ratio of the transmission which transmits rotation from a power source to driving wheels. The transmission includes a synchromesh mechanism having a plurality of constantly meshed gear pairs possessing different gear ratios, with one of the gear pairs being selected as an effective gear pair. The synchromesh mechanism also has a sleeve and a synchronizer ring, with the sleeve being mounted on a shaft on which one of each of the gear pairs is mounted as an idle gear. The sleeve is rotatable together with the shaft and is movable in the axial direction of the shaft. The synchronizer ring is rotatable and movable relative to the idle gear, and the synchromesh mechanism is brought into operation to establish synchronization between the idle gear and the sleeve in such a manner that the sleeve is moved in the axial direction to be engaged with the synchronizer ring, and subsequently the engaged synchronizing ring is urged onto a friction surface of the idle gear so as to be rotatable together with the idle gear. The shifting device includes an electrically controlled actuator generating a load for acting on the sleeve to move the sleeve in the axial direction in response to a driving signal, and a control device outputting the driving signal to the actuator upon current synchronization control to change the gear-ratio of the transmission on the basis of at least one of the vehicular driver's intention, the state of the vehicle, and the state of the transmission. The control device includes a driving signal determination mechanism for determining the driving signal on the basis of an initial relative rotation number and a relative rotation number deviation. The initial relative rotation number being is as a relative rotation between the idle gear and the sleeve at initiation of the current synchronization control. The relative rotation number deviation is a deviation between a target relative rotation number and an actually detected relative rotation number. The target relative rotation number is between the idle gear and the sleeve at the latest synchronization control, while the actually detected relative rotation number is between the idle gear and the sleeve at the latest synchronization control.

Theoretically speaking, in a typical synchromesh-type transmission, a fixed relation is found between the initial relative rotation number, the synchronization time duration, and the sleeve load, so that the initial relative rotation number is the relative rotation number between the idle gear and the sleeve at an initiation of a specific synchronization, the synchronization time duration is the elapsed time duration from the initiation to termination of the synchronization, and the sleeve load is a load applied to the sleeve from an actuator. Thus, if a predetermined synchronization time duration is employed as the target synchronization time duration, based thereon, the sleeve load is determined or decided relative to the initial relative rotation number and consequently a suitable driving signal is applied to the actuator for realizing the determined sleeve load. In such a way, the initial relative rotation number is an effective or a valid physical quantity for determining the driving signal throughout the synchronization control.

Moreover, an error in the driving signals in the latest or previous synchronization control is reflected in the relative rotation number deviation which is the deviation of the actual relative rotation number in the latest synchronization control from the target relative rotation number. Thus, taking into account the relative rotation number deviation in the latest synchronization control makes it possible to make the relation between the initial rotation number and the driving signal more adequate or appropriate in each synchronization control.

In view of the above, in the shifting device here, the driving signal to be applied to the actuator in each synchronization control is determined on the basis of the initial relative rotation number in each synchronization control and the relative rotation number deviation in the latest synchronization control. Thus, despite that the driving signal which governs the entirety of each synchronization is determined on the basis of the initial relative rotation number, the control error in the latest synchronization control is fed back to the next synchronization control, and so the driving signal for the next synchronization control is determined with much higher precision. Therefore, the shifting device here make it possible to stabilize the actually required time duration for each synchronization when a plurality of synchronizations are performed.

Considering the relative rotation number deviation in the latest synchronization control, a specific value at a point in time in the latest synchronization control which is representative of the entire latest synchronization control or a history of the relative rotation number deviation throughout the latest synchronization control can be utilized. With respect to the history of the relative rotation number deviation throughout the latest synchronization control, examples can include an integral value of a relative rotation number deviation in the latest synchronization control, a differential value thereof, a summation of a plurality of successively obtained relative rotation number deviations in the latest synchronization control, and an average of the plurality of successively obtained relative rotation number deviations in the latest synchronization control.

The power source utilized here may be an internal combustion engine, an electric motor, or a combination of the engine and the electric motor. Also, the control device can be of a type in which the actuator is made controlled mainly by an output signal issued from a sensor which detects the driver's intention, particularly the driver's gear shift intention with respect to a shift lever or the like. The control device can also be of a type in which the actuator is controlled mainly by output signals of respective sensors, with one of the sensors being a sensor which detects the driver's intention, particularly the driver's vehicle acceleration/deceleration intention such as indicated by an acceleration pedal or the like. Another sensor can detect the vehicle's state such as the vehicle speed or the power source rotation number.

In general, vehicles on which a synchromesh-type transmission is provided include a clutch to engage and disengage the power source and the synchromesh-type transmission. The clutch can be two types, one operated directly by the driver, the other operated by an electrically controlled actuator. If the automatic type clutch is employed, the control device used here can be of a type in which the control device is in association with an actuator which controls an actuator and also controls a clutch of the actuator.

The synchromesh mechanism is employed in the same transmission and is constructed in such a manner that one of the gear pairs is selected as an effective gear pair. In addition, the actuator can be an electrically operated driving source utilizing type or a pressure source utilizing type. The electrically operated driving source utilizing type is an actuator which is operated by controlling an electrical driving source or a control device coupled thereto, while the pressure source utilizing type is an actuator which is operated by controlling a pressure source such as a pump or accumulator for generating a pressure and an electromagnetic valve or the like coupled thereto.

The present shifting device can be adopted in a transmission in which the shaft and the power source are coupled to the driving wheels and the non-idle gear, respectively. The shifting device can also be adopted in a transmission in which the shaft and the non-idle gear are coupled to the power source and the driving wheels, respectively.

In the shifting device, the relative rotation number deviation is defined by at least one of an overall value of the relative rotation number deviation in the latest synchronization control, a synchronization time duration deviation between an actual synchronization time duration ranging from initiation to completion of the latest synchronization and a target synchronization time duration, an elapsed time relative rotation number deviation as an actual relative rotation number which is to be zero when the target synchronization time duration elapsed in the latest synchronization control, and a change gradient deviation between an actual relative rotation number change gradient in the latest synchronization control and a target relative rotation number change gradient.

The relative rotation number deviation in the first aspect can be defined or determined by an overall value of the relative rotation number deviation in the latest synchronization control. In addition, the relative rotation number deviation can be defined or determined by the synchronization time duration between the actual and target synchronization time durations in the latest synchronization control. The reason is that whether the actual synchronization time duration is shorter or longer than the target synchronization time duration involves consideration of whether the time when the actual relative rotation number becomes zero is prior to or later than the scheduled time. Moreover, the relative rotation number deviation can be defined or determined by the elapsed time relative rotation number deviation which is to be zero when the target synchronization time duration elapsed in the latest synchronization control. Further, the relative rotation number deviation can be defined or determined by the change gradient deviation between the actual relative rotation number change gradient in the latest synchronization control and the target relative rotation number change gradient.

The relative rotation number deviation can be defined or determined by one of the overall value of relative rotation number deviation, the synchronization time duration deviation, and the change gradient deviation. The overall value can be, for example, a time-related integrated value of the relative rotation number deviation in the latest synchronization control or a summation of a plurality of intermittently obtained relative rotation numbers in the latest synchronization control.

The driving signal determination mechanism has a signal determining portion which determines the driving signal corresponding to an actual initial relative rotation number at each synchronization control pursuant to a relation between the initial relative rotation number and the driving signal, and a relation-correcting portion performing a correction on the basis of the relative rotation number deviation at the latest synchronization control, prior to the current synchronization control, in such a manner that the resultant (i.e., corrected relation) makes an actual synchronizing time duration between initiation and termination of the current synchronization control much closer to a target synchronizing time duration.

The driving signal corresponding to the actual initial relative rotation number at each synchronization control is determined pursuant to the relation between the initial relative rotation number and the driving signal, and prior to the current synchronization control a relation-correction is performed in such a manner that the resultant (i.e., the corrected relation) makes the actual synchronizing time duration between the initiation and the termination of the current synchronization control much closer to the target synchronizing time duration. The relation between the initial rotation number and the driving signal in the current synchronization control is corrected so that the target synchronization time duration of each synchronization control is more precise by feeding back the relative rotation number deviation in the latest synchronization control. Thus, it is possible to put the shifting device into practice in a preferable mode by correcting the current relation between the initial rotation number and the driving signal in the latest synchronization control.

The relative rotation number deviation is defined on the basis of at least one of: an overall value of the relative rotation number in the latest synchronization control; a synchronization time duration deviation of an actual synchronization time duration between initiation and completion of the latest synchronization relative a target synchronization time duration; an elapsed time relative rotation number deviation as an actual relative rotation number which is to be zero when the target synchronization time duration elapsed in the latest synchronization control; and a change gradient deviation between an actual relative rotation number change gradient in the latest synchronization control and a target relative rotation number change gradient. The relation-correcting portion corrects the relation in such a manner that at least one of the overall value, the synchronization time duration deviation, the elapsed time relative rotation number deviation, and the change gradient deviation are made close to zero.

The correction of the relation between the initial relative rotation number and the driving signal is performed in such a manner that one of the overall value, the synchronization time duration deviation, the elapsed time relative rotation number deviation, and the change gradient deviation is made close to zero, resulting in that the corrected relation determines the driving signal in such a manner that the actual synchronization time duration ranging from its initiation to completion approaches the target synchronization time duration.

According to another aspect of the invention, the relation-correcting portion corrects the relation on the basis of at least two of the overall value, the synchronization time duration deviation, the elapsed time relative rotation number deviation, and the change gradient deviation. This results in the correction precision being improved relative to when the correction is based on one of the overall value, the synchronization time duration deviation, the elapsed time relative rotation number deviation, and the change gradient deviation.

The relation-correcting portion can also correct the relation, prior to an initiation of a new synchronization control, on the basis of the relative rotation number deviation and an actual driving signal in the latest synchronization control.

When the correction of the relation between the initial relative rotation number and the driving signal is based on the actual driving signal in addition to the relative rotation number deviation, the resultant correction can be made with higher precision than a correction based on only the relative rotation number deviation.

In view of the above, prior to a new or current synchronization control, a correction of the relation is made based on the relative rotation number deviation and the actual driving signal in the latest synchronization control.

With respect to the actual driving signal in the latest synchronization control, a specific value at a time point in the latest synchronization control which is representative of the entire latest synchronization control or a history of the relative driving signal throughout the latest synchronization control can be employed by way of example. With respect to the history of the driving signal throughout the latest synchronization control, examples include an integral value (level) of signal fed to the actuator in the latest synchronization control, a differential value thereof, a summation of a plurality of successively applied values (levels) of signals fed to the actuator in the latest synchronization control, and an average of the plurality of successively applied values (levels) of signals fed to the actuator in the latest synchronization control.

The shaft is operatively connected to the driving wheels, the other of the gear pairs is operatively connected as a non-idle gear to the power source, and the relative rotation number is obtained as an input rotation number, i.e., the rotation number of the idle gear. The shaft and the idle gear in the synchromesh mechanism are connected to the driving wheels and the power source, respectively. If a comparison is made between the driving wheel and the power source from the viewpoint of rotation stability, the driving wheel is of a strong tendency to be rotated at constant speeds, while the power source is not so or is weak. Thus, when the driving wheel is connected to the shaft which is impossible to rotate relative to the sleeve and when the power source is connected to the non-idle gear which is continually in meshing engagement with the idle gear, there is a tendency in which a time-series change in relative rotation number between the sleeve and the idle gear is in coincidence with a time-series change in rotation number of the idle gear.

When the shaft and the non-idle gear are connected to the driving wheels and the power source, respectively, the relative rotation number is obtained as the rotation number of the idle gear, i.e., the input rotation number. Thus, in the present shifting device, the relative rotation number can be easily obtained when compared to a structure in which the shaft and the non-idle gear are connected to the driving wheels and the power source, respectively, and the relative rotation number is obtained as a deviation between the rotation number of idle gear (i.e., the input rotation number) and the rotation number of the sleeve (i.e., the output rotation number).

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 11 is a flow chart illustrating an input rotation number deviation related data collection routine carried out in step S502 in FIG. 10.

FIG. 12 is a flow chart illustrating the correction processing routine for step S504 in FIG. 10.

DETAILED DESCRIPTION OF THE INVENTION

Figure 1:
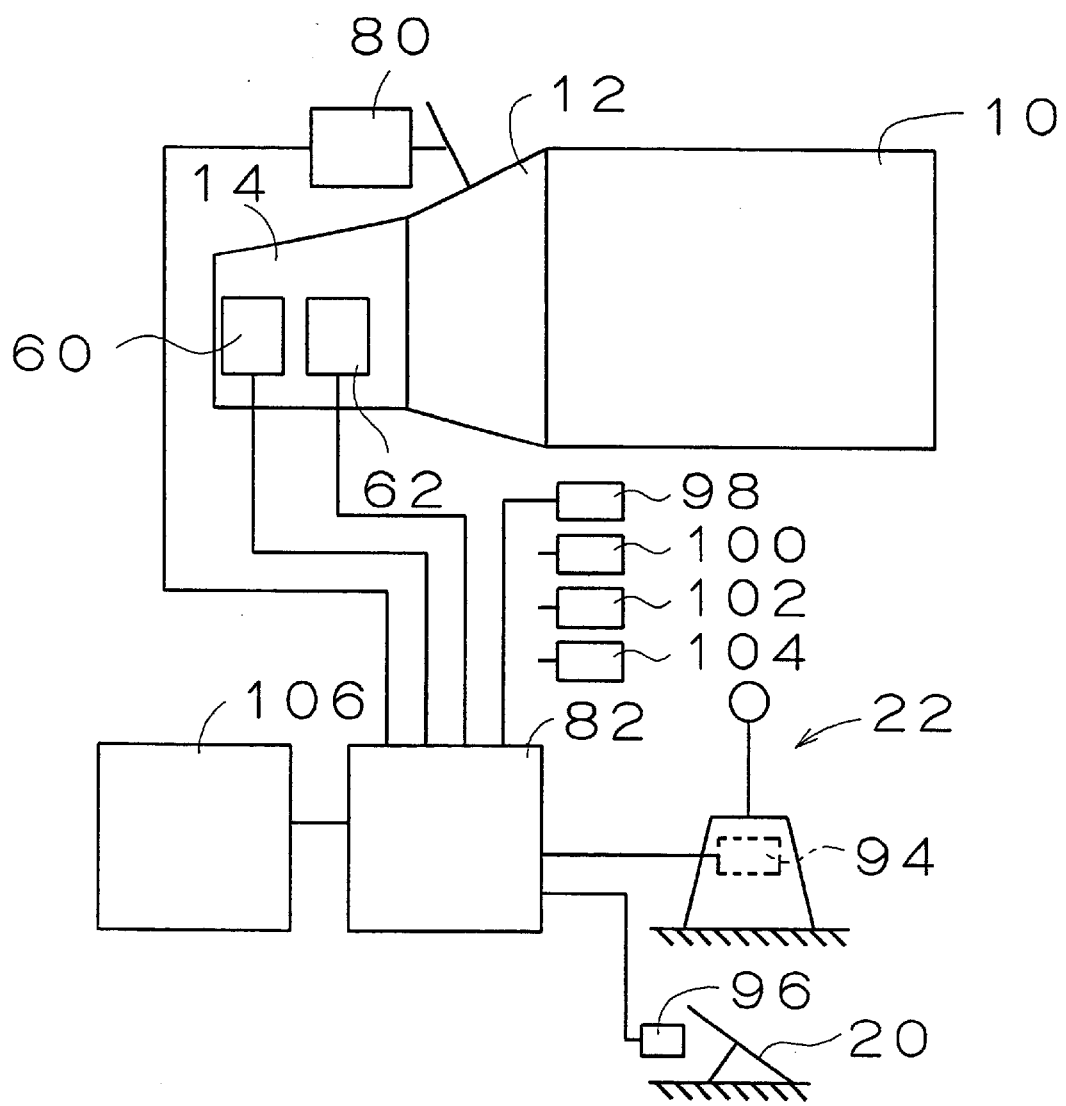
FIG. 1 is a schematic illustration of a vehicular mechanical transmission system utilizing a shifting device in accordance with the present invention.

Referring initially to FIG. 1 which schematically illustrates a vehicular mechanical transmission system advantageously utilizing a shifting brake in accordance with the present embodiment, the shifting device is adapted to be mounted on an automotive vehicle whose driving power source is an internal combustion engine 10. In this automotive vehicle, an output shaft of the engine is operatively connected to a plurality of driving wheels by way of a clutch 12 and a synchromesh-type transmission 14.

This vehicle is provided with an acceleration pedal 20 serving as an acceleration operation means which is operated by a driver for accelerating the vehicle. This vehicle also includes a shift lever 22 serving as a gearshift operation means which is manipulated by the driver for changing the gear ratio of the transmission 14. The shift lever 22 is adapted to move in an H-shaped pattern similar to a shift lever which is provided in an automotive vehicle for changing the gear ratio of a fully manually operated transmission. Thus, the gear-ratio changing operations of the shift lever 22 are divided into a vehicle-lengthwise direction shift operation and a vehicle-widthwise direction shift operation. However, it is not an essential requirement to constitute the gearshift operation means as the above-mentioned shift lever 22 and thus it is possible to constitute the gearshift operation means as an incremental type switch, for example, which is provided in a driver operated steering handle.

Figure 2:
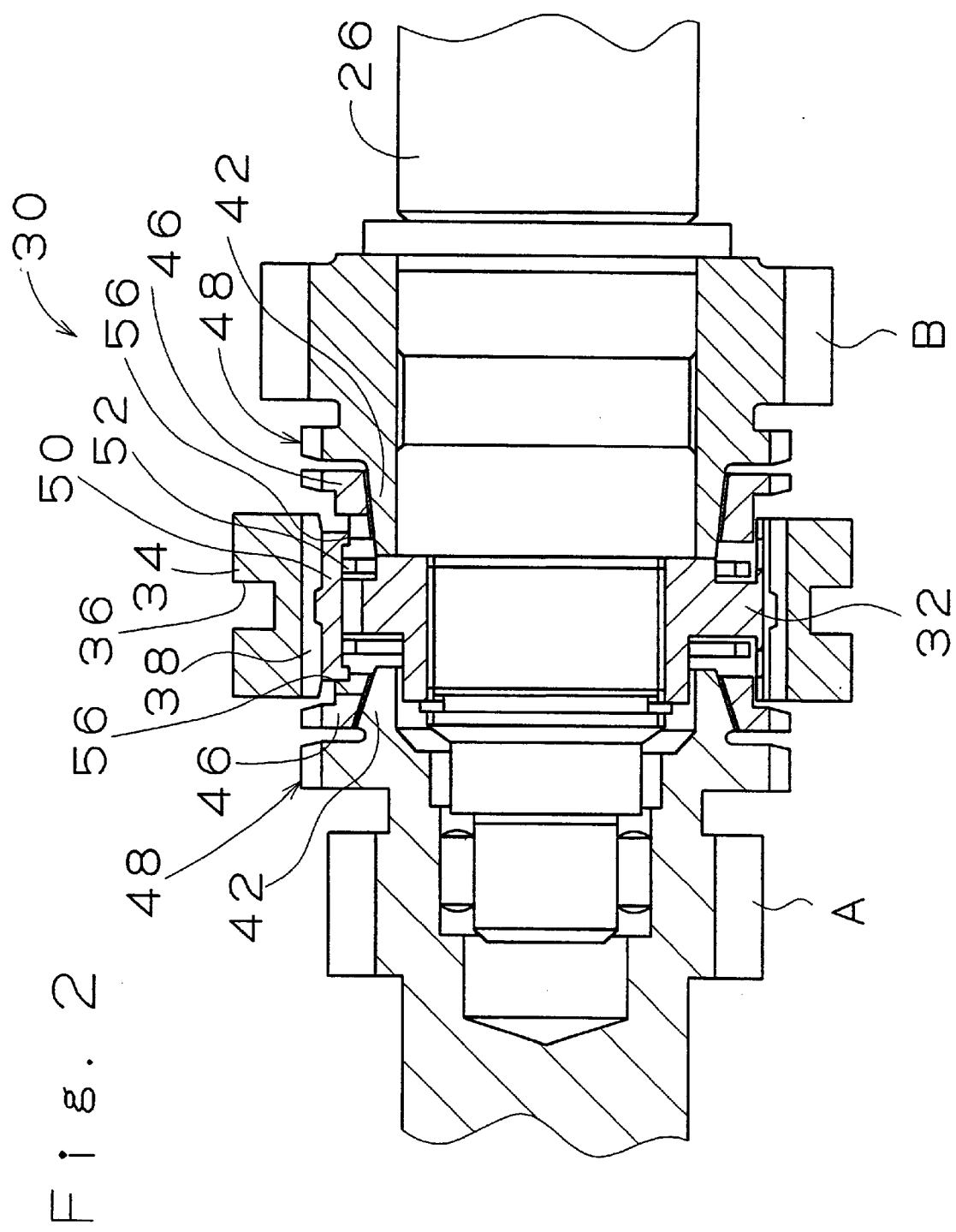
FIG. 2 is a cross-sectional view of a synchromesh mechanism of the vehicular mechanical transmission system shown in FIG. 1.

As is well known, the transmission 14 includes an input shaft coupled to the clutch 12, an output shaft 26 shown in FIG. 2 which is in co-axial alignment with the input shaft, and a counter shaft arranged in parallel to each of the input shaft and the output shaft 26. A gear pair is provided between the input shaft and the counter shaft for effecting continual rotational transmission from input shaft to the counter shaft. A plurality of gear pairs possessing different gear ratios are provided between the output shaft 26 and the counter shaft to transmit the rotation of the counter shaft to the output shaft 26 by way of one effective gear pair selected from the plural gear pairs. The selection of the gear pair as the effective gear pair is established by performing or operating one of the (i.e. the corresponding) synchromesh devices.

FIG. 2 illustrates a synchromesh mechanism 30 as a representative one of the synchromesh devices. This synchromesh mechanism is a so-called "Borg Warner" type synchromesh device forming an inertial lock or balking type synchromesh device. The synchromesh mechanism 30 is provided at its output shaft 26 with a clutch hub 32 which is always incapable of rotating relative thereto. A sleeve 34 is mounted on an outer portion of the clutch hub 32 so as to be movable in an axial direction and always immovable in a circumferential direction of the clutch hub 32. An annular groove 34 is formed on the outer portion of the sleeve 34. A bifurcated shift fork is fitted in the annular groove 36 in such a manner that the sleeve 34 is sandwiched thereby. The sleeve 34 is adapted to move in the axial direction together with the shift fork under a condition that the sleeve 34 is permitted to rotate relative to the shift fork.

A plurality of teeth are formed on the inner surface of the sleeve 34 and are arranged in the circumferential direction. These teeth constitute a clutch 38.

A pair of respective gears A, B are rotatably mounted on a pair of axially spaced fixed points on the output shaft 26. Each of the gears A, B functions as an idle gear and is always in meshing engagement with the corresponding gear which is fixedly mounted on the counter shaft.

A cone 42 is formed on the outer surface of an axial portion of the gear A which is adjacent to the sleeve 34. The cone 42 has an outer conical surface or cone shaped surface that is progressively reduced in diameter toward the sleeve 34. This conical surface 42 serves as an example of a frictional surface.

A synchronizer ring 46 is provided on the cone 42. The synchronizer ring 46 is complementary to the conical surface of the cone 42. A plurality of teeth are formed on the outer surface of the synchronizer ring 46. The teeth are arranged in the circumferential direction of the synchronizer ring 46 and are adapted to mesh selectively with the clutch 38 of the sleeve 34.

On another portion of the outer surface of the axial portion of the gear A located adjacent to the cone 42 is formed a plurality of teeth which are arranged in the circumferential direction. These teeth constitute a clutch 48 at the gear A. The clutch 48 is adapted to mesh selectively with the clutch 38 of the sleeve 34.

A plurality of shifting keys 50 is provided between the clutch hub 32 and the sleeve 34. The shifting keys 50 are held at a plurality of circumferentially spaced fixed positions, respectively. The shifting keys 50, which are of a fixed width, extend in the axial direction of the sleeve 34. A key spring 52 is disposed between the shifting key 52 and the clutch hub 32 to urge the shifting key 50 onto the inner surface of the sleeve 34. The shifting key 50 is formed thereon with a convex or projection which is capable of being in engagement with a concave or recess at the inner surface of the sleeve 34. This structure makes it possible to move the sleeve 34 together with the shifting key 50 as a unit when the concave (recessed portion) fails to exceeds the slant surface of the convex (projection) due to the fact that a force acting between the sleeve 34 and the shifting key 50 is less than a predetermined value. On the other hand, if the concave (recessed portion) exceeds the slant surface of the convex (projection) when the force becomes larger than the predetermined value, the sleeve 34 alone is brought into movement, with the shifting key 50 being left.

The plural shifting keys 50 are partly fitted into a plurality of concaves or recesses 56, respectively, which are formed at a side of the synchronizer ring 46. The recesses 56, which are of a fixed width, extend in the axial direction of the synchronizer ring 46. The width of the recesses 56 is designed to be slightly larger or longer than the width of the corresponding shifting key 50. Such a dimensional design or setting allows relative rotation over a predetermined angular range between the sleeve 34 and the synchronizer ring 46. In addition, the bottom of the recesses 56 is placed at a position to define a clearance between the bottom and the distal end of the shifting key when both the sleeve 34 and the synchronizer ring 46 are placed at the respective initial positions. The clearance decreases (i.e., becomes smaller and smaller) as the shifting key 50 approaches the synchronizer ring 46 and ultimately disappears. Under the disappeared state of the clearance, an axial force of the shifting key 50 is transmitted to the synchronizer ring 46, which causes the synchronizer ring 46 to be pushed along the conical surface 42. Thus, the relative rotation between the sleeve 34 and the gear A decreases.

After the shifting key 50 is brought into engagement with the synchronizer ring 46, if the sleeve 34 is moved further in the same direction, as previously mentioned, the sleeve 34 is moved by itself and the distal end of each tooth is brought into engagement with the distal end of the teeth of the synchronizer ring 46. Under the condition that the relative rotation between the sleeve 34 and the gear A is not substantially zero, the widthwise clearance between the shifting key 50 and the recesses 56 disappears, so that the synchronizer ring 46 does not rotate freely relative to the sleeve 34. Thus, the synchronizer ring 46 prevents the sleeve 34 from moving toward the synchronizer ring 46. This is called the balked state of the sleeve 34. However, simultaneously, the sleeve 34 urges the synchronizer ring 46 further and more strongly onto the cone 42, which ultimately causes relative rotation between the sleeve 34 and the gear A to be substantially zero.

While the relative rotation between the sleeve 34 and the gear A is zero, i.e., during the synchronization completed state, very little friction force is generated between the synchronizer ring 46 and the cone 42, which makes it possible for the synchronizer ring 46 to rotate freely relative to the sleeve 34. Thus, thereafter, the teeth of the sleeve 34 advance with respect to the teeth of the synchronizer ring 46 urged in the circumferential direction, thereby establishing a meshing engagement between the teeth of the sleeve 34 and the teeth of the synchronizer ring 46. Subsequently, the teeth of the clutch 38 of the sleeve 34 advanced with respect to the teeth of the clutch 48 of the gear A urged in the circumferential direction, thereby ultimately establishing a meshing engagement between the clutch 38 of the sleeve 34 and the clutch 48 of the gear A.

Like the gear A, the gear B is provided with a cone 42 and a clutch 48. A synchronizer ring 46 is also provided on the cone 42.

While the teeth of the clutch 38 of the sleeve 34 are meshed with both of teeth of the synchronizer ring 46 on the gear A side and the teeth of the clutch 48 of the gear A, the rotation of the gear A is transmitted to the output shaft 26. Under this state, the gear A and the gear always meshed therewith and rotating together with the counter shaft constitute the effective gear pair. On the other hand, when the teeth of the clutch 38 of the sleeve 34 mesh with both the teeth of the synchronizer ring 46 on the gear B side and the teeth of the clutch 48 of the gear B, the rotation of the gear B is transmitted to the output shaft 26. Under this state, the gear B and the gear always meshed therewith and rotating together with the counter shaft constitute the effective gear pair. Thus, depending upon the movement of the sleeve 34, the changeover between rotation of the gear A and the rotation of the gear B is effected, thereby changing the gear ratio of the transmission 14.

In this shifting device, the changing of the gear ratio of the transmission 14 (i.e., gearshift) is performed automatically. In this shifting device, the shift fork fitted in the sleeve 34 of each of the synchromesh devices 30 is operatively connected to an actuator device by way of a transmitting mechanism 66 shown in FIG. 3.

The actuator device includes, as illustrated in FIG. 1, a shift actuator 60 which is associated with shift operation of the shift lever 22 and a select actuator 62 which is associated with a select operation. The shift actuator 60 and the select actuator 62 can be an electrically operated type actuator or a pressure source utilizing type actuator.

Figure 3:
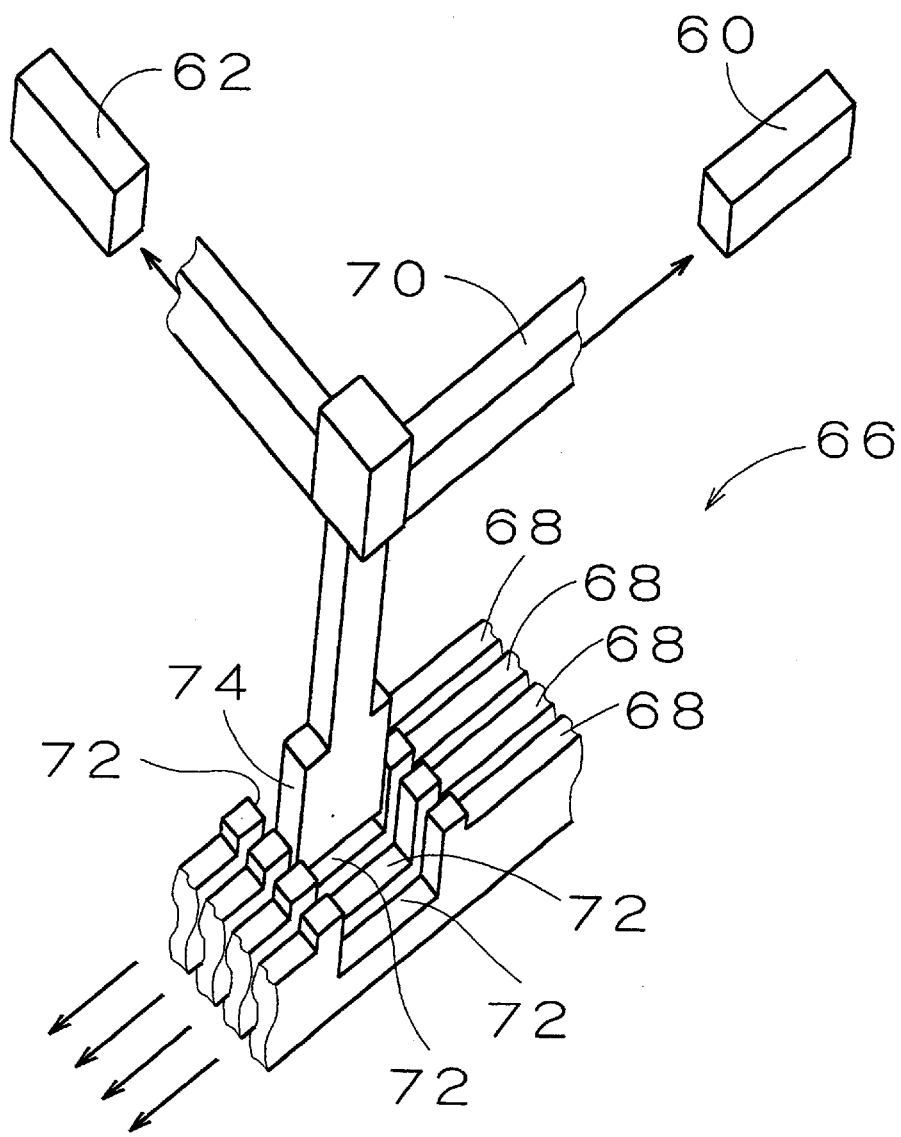
FIG. 3 is a perspective view of a transmitting mechanism employed in the vehicular mechanical transmission system shown in FIG. 1.

As illustrated in FIG. 3, the transmitting mechanism 66 includes a plurality of shifting rods 68 which are arranged in parallel to the axial direction of each of the sleeves 34 and each of which extends from the corresponding shift fork. In addition, the transmitting mechanism 66 includes a transmitting rod 70 through which a load generated at the shift actuator 60 is transmitted to one of the plurality of shifting rods 68. Each of the shifting rods 68 is formed with an engaging portion 72. An engaging portion 74 of the transmitting rod 70 is fitted into the engaging portion 72 of the selected shifting rod 68. Selection of one of the engaging portions 72 is performed by moving the engaging portion 74 of the transmitting rod 70 relative to the series of engaging portions 72. This relative movement of the engaging portion 74 is established by the select actuator 62.

The clutch 12, which is of a well-known structure, switches between an engaged state in which the output shaft of the engine 10 is connected to the input shaft of the transmission 14 and a disengaged state in which the output shaft of the engine 10 is disconnected from the input shaft of the transmission 14. In this shifting device, the switching the clutch 12 is also performed automatically by the clutch actuator 80 shown in FIG. 1. Similar to the shift actuator 60 and the select actuator 62, the clutch actuator 80 can be also in the form of an electrically operated type actuator or a pressure source utilizing type actuator.

Figure 4:
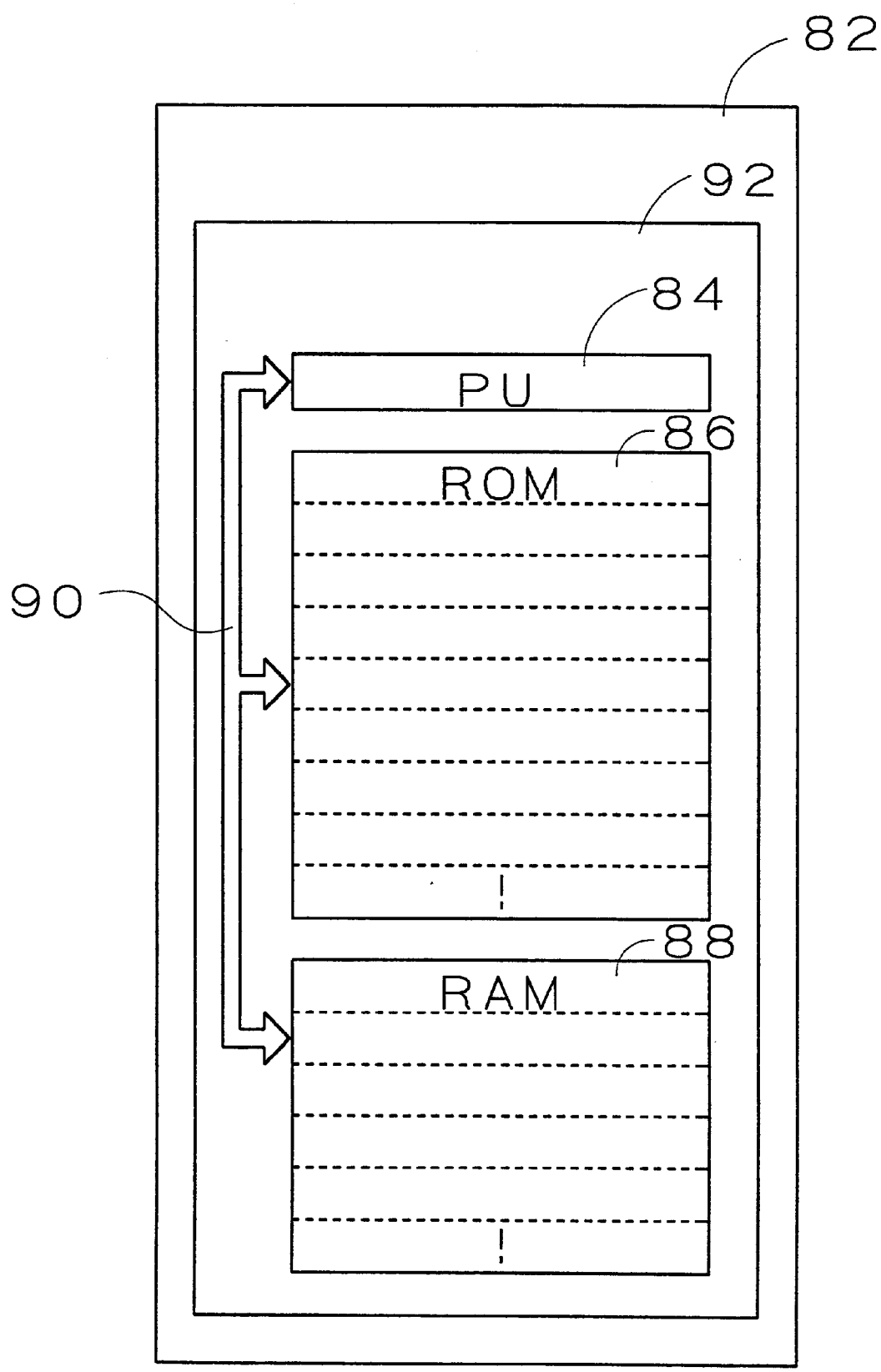
FIG. 4 is a block diagram schematically illustrating the inner structure of an ECU for the shifting device.

The clutch actuator 80, the shift actuator 60 and the select actuator 62 are under the control of a transmission ECU (Electronic Control Unit). As shown in FIG. 4, the transmission ECU is primarily comprised of a computer 92 in which a processing unit (PU) 84 having one or more processors, a read only memory (ROM) 86, and a random access memory (RAM) 88 are mutually connected to each other by way of a bus 90.

As shown in FIG. 1, the input portion of the transmission ECU 82 is connected with a variety of sensors for detecting the driver's intention for driving the vehicle. The sensors include a shift position sensor 94 which detects an operation position of the shift lever 22 and an acceleration pedal position sensor 96 which detects an operation position of the acceleration pedal 96.

The input portion of the transmission ECU 82 is connected with another variety of sensors for detecting the operating state of the transmission 14. As shown in FIG. 1, the sensors include a position sensor 98 which directly or indirectly detects the moved position of the sleeve 34 (e.g. a sensor which detects the moved position of one of the shifting rod 68, the transmitting rod 70, and the shift fork as the moved position of the sleeve 34), a load sensor 100 which directly or indirectly detects the sleeve load applied to the sleeve 34, an input rotation number sensor 102 for detecting an input rotation number Nin which is indicative of the rotation number of the input shaft of the transmission 14, and an output rotation number sensor 104 for detecting an output rotation number Nout which is indicative of the rotation number of the output shaft 26.

The output portion of the transmission ECU 82 is connected with the shift actuator 60, the select actuator 62, and the clutch actuator 80. On the basis of the signals issued or fed from the respective sensors 60, 62, 80, the transmission ECU 82 controls related values (such as instantaneous current, instantaneous voltage, integrated current, and integrated voltage) of electric energy to be supplied to each of the shift actuator 60, the select actuator 62, and the clutch actuator 80.

The way in which the transmission ECU 82 is connected to the shift actuator 60, the select actuator 62, and the clutch actuator 80 is described in greater detail. Using a well-known technique or method, the transmission ECU 82 is connected to the shift actuator 60, the select actuator 62, and the clutch actuator 80 by way of a driver that is connected to a power supply. The transmission ECU 82 controls an indication signal to the driver to control the related values of the electric energy to be supplied to each of the shift actuator 60, the select actuator 62, and the clutch actuator 80 via the driver from the power source. The following explanation describes the manner of supplying the electric energy to the actuators 60, 62, and 80 from the driver in response to the instruction signal from the transmission ECU 82 as represented by the output (or supply) of the driving signals to the respective actuators 60, 62, 80 from the transmission ECU 82.

The transmission ECU 82 communicates with one or more of the other ECUs which serve for controlling the vehicle. One example of these ECUs is an engine ECU 106 which controls the engine 10. The transmission ECU 82 receives its required signals from the other ECUs and vice versa.

As shown in FIG. 4, the ROM 86 stores a plurality of programs such as a main program, a select actuator control program, a shift actuator control program, a clutch actuator control program, and a map correction program which are illustrated by way of flow charts in FIGS. 5, 6, 7, 9 and 10, respectively. These programs are capable of being executed by one or more of the processors which constitute the PU 84.

While these programs are being executed, the RAM 88 is available if requested. As shown in FIG. 4, the RAM 88 is divided into a plurality of regions including a gear stage related data store region, a flag region, a driving signal decision map store region, and a correction related data store region. The content of each program is described below utilizing one or more of the regions as its required region(s) during execution.

Figure 5:
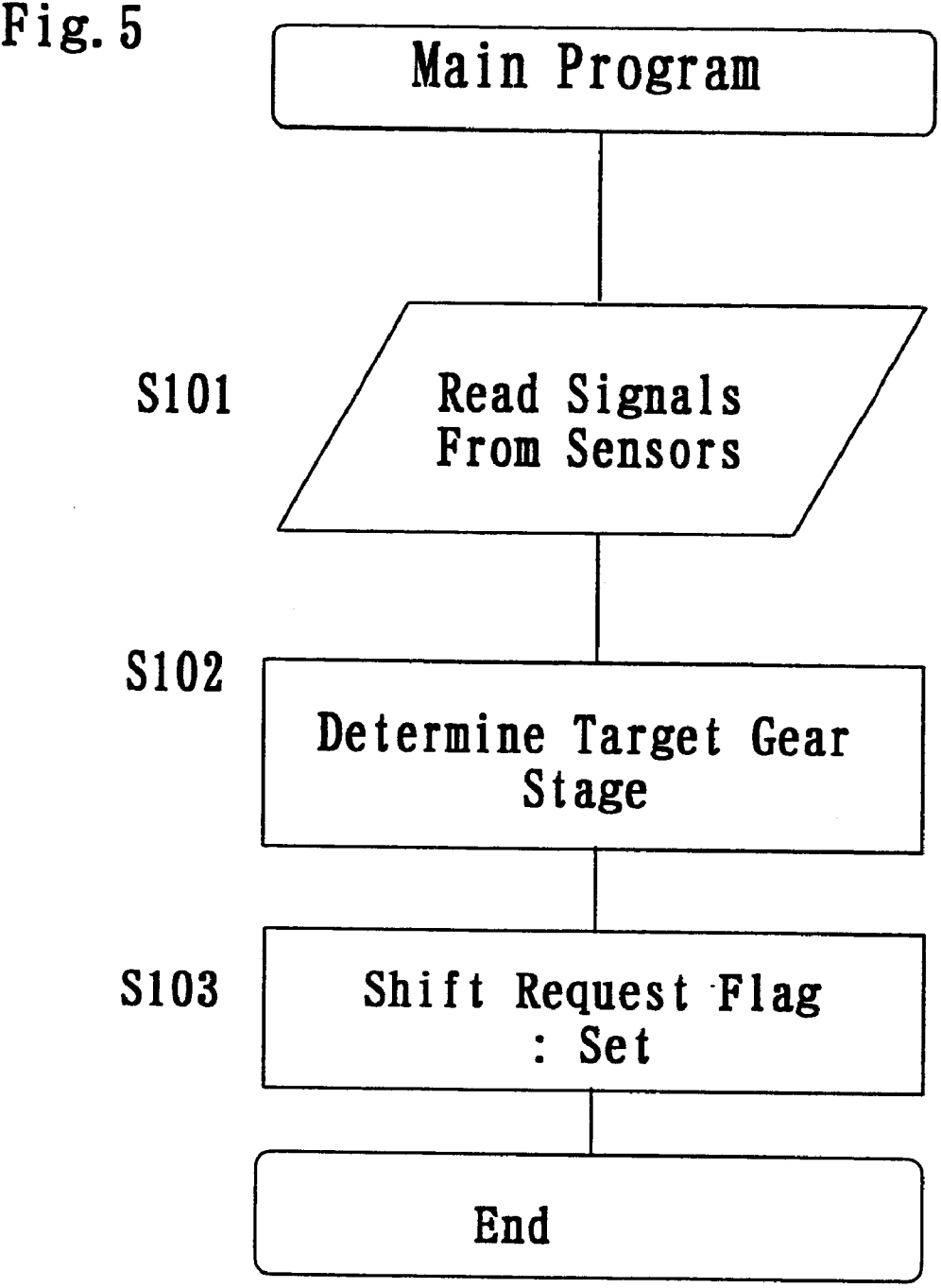
FIG. 5 is a flow chart of a main program executed in the ECU shown in FIG. 4.

Referring first to FIG. 5, the content of the main program is explained. This main program is executed in a repetitious manner after the power source is turned on. At step S101, the signals are inputted from the sensors including the shift position sensor 94. Next, at step S102, on the basis of the resultant signals, a target gear stage as a desired gear stage to be currently selected in the transmission 14 is decided. That is, it is determined if the gear stage (gear ratio) of the transmission 14 is shifted to the 1st gearshift or the 2nd gearshift, for example. In addition, at this step the data which is indicative of the decided target gear stage is stored in the gear stage related data store region.

Thereafter, at step S103, a shift request flag is set. When it is set, the shift request flag is indicative of a gearshift request being issued and when it is reset, it is indicative of a gearshift request not being issued. This request flag is stored in the flag region of the RAM 88 and is always reset whenever the power source of the computer 92 is turned on. At this stage, one execution cycle of the main program is terminated.

Figure 6:
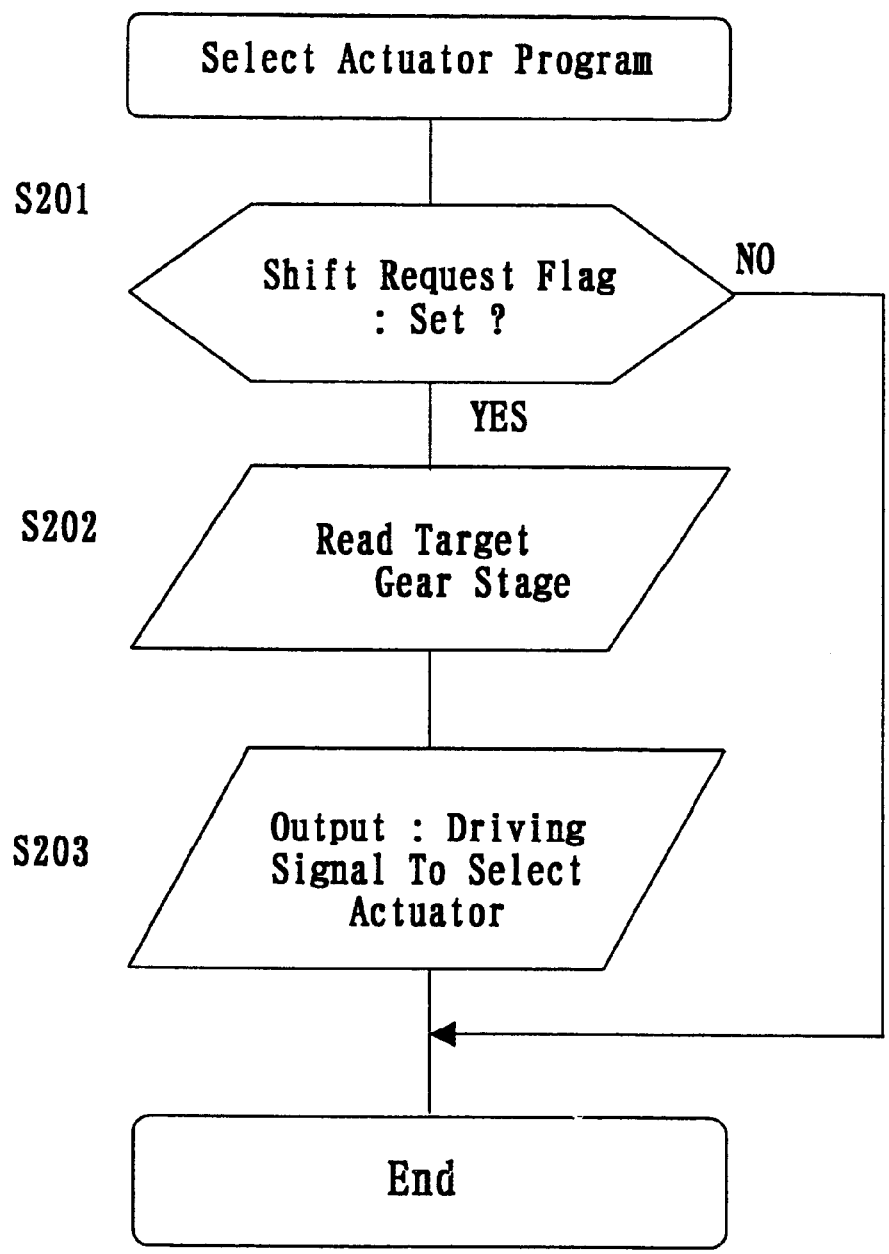
FIG. 6 is a flow chart of a select actuator control program executed in the ECU shown in FIG. 4.

Next, the content of the select actuator control program is described with reference to FIG. 6. Like the main program, this program is also executed in repetitious manner. In each execution, it is determined at step S201 whether or not the shift request flag is set. In the situation where no gearshift is requested, the result becomes NO, which terminates immediately one execution cycle. On the other hand, if the gearshift is requested, the result in step S201 is YES, and the program proceeds to step S202 where the target gear stage is read from the RAM 88. At S203, a driving signal which is required for selecting the target gear stage is outputted to the select actuator 62. Thus, the engaging portion 74 of the transmission rod 70 is brought into engagement with the engaging portion 72 of the shifting rod 68 which corresponds to the target gear stage. At this stage, the execution of this program terminates.

Next, the content of the shift actuator control program is described with reference to the program or flowchart shown in FIG. 7. Like the main program and the select actuator program, this program is also executed in a repetitious manner. During each execution, it is determined at step S301 whether or not the shift request flag is set in the RAM 88. When no gearshift is requested, the result in step S301 is NO, thus immediately terminating one execution cycle of this program.

On the other hand, if the gearshift is requested, the result in step S301 is YES, and a step S302 the target gear stage is read from the RAM 88. Then, the required operating direction of the shift actuator 60 for the selection of the target gear stage is determined at step S303. That is, a determination is made regarding the moving direction of the sleeve 34 of the selected one of the synchromesh devices 30 by the select actuator 62 in order to mesh the clutch 38 of such sleeve 34 with the clutch 48 of one of the idle gears for realizing or achieving the target gear stage (abbreviated to target idle gear).

Thereafter, at step S304, it is determined whether or not the forward movement of the sleeve 34 is at a pre-balk stage of the balk state which prevents a further movement of the sleeve 34. For example, as indicated in the foregoing reference, this determination is made by checking whether or not the absolute value of a temporal change of a difference exceeds a threshold value which is between the input rotation number Nin and the output rotation number Nout which are detected by the respective input rotation number sensor 102 and the output rotation number sensor 104. If it is found that the absolute value has not exceeded the threshold value, the sleeve 34 is found to be at the pre-balk state.

When it is found that the sleeve 34 is at the pre-balk state, the result of the decision at step S304 is YES and the program proceeds to step S305. At this step, it is judged that the sleeve 34 is at a shift-out/in state at which the sleeve 34 is going to be shifted in a position for establishing the target gear stage after being shifted out from a position for establishing the currently selected gear stage. Each of the shift-in and shift-out operations of the sleeve 34 is performed by one of the synchronizing devices 30 commonly or by two of the synchronizing devices 30 independently. Thereafter, at step S306, a required load F* which is required to be applied to the sleeve 34 is determined or adjusted so as to be suitable for the shift-out/in. Subsequently, at step S307, the driving signals required for moving the sleeve 34 in the direction determined at step S303 and for realizing the required load F* determined at step S306 are fed to the actuator 60. Then, the program goes back to step S304.

Executing steps S304 through S307 in a repetitious fashion causes the sleeve 34 to engage the synchronizer ring 46, resulting in the sleeve 34 being found to be at the balk state, whereupon the decision result at step S304 becomes NO and the program goes to step S308 to execute a synchronization control.

A conceptual detailed description of the content of step S308 is illustrated, in a flowchart, as a synchronizing control routine. First, the content of this synchronizing control routine is outlined.

1. This synchronizing control routine performs the synchronizing control one time between a balk initiation time at which the sleeve 34 begins to engage with the synchronizer ring 46 and a synchronization completion time at which the synchronizing operation is substantially completed.

2. This synchronizing control routine determines an appropriate driving signal $S^F$ as the driving signal S to be applied to the shift actuator 60, on the basis of an initial rotation number Nr0 representing the difference between an initial input rotation number Nin0 and an initial output rotation number Nout0. The initial input rotation number Nin0 and the initial output rotation number Nout0 are the input rotation number Nin and the output rotation number Nout which are determined, respectively, upon initiation of the synchronization. In addition, the input rotation number Nin is indicative of the rotation number of the target idle gear which is calculated by multiplying the rotation number (input rotation number Nin in a narrow sense) with all the gear ratios of a gear train which extends from the input shaft and the target idle gear. However, as a matter of explanation convenience, unless otherwise specified, the input rotation number of the target idle gear is substituted by the input rotation number Nin.

In more detail, this synchronizing control routine decides the appropriate driving signal $S^F$ depending on the relationship established between an initial relative rotation number Nr0 and the driving signal S. At this point, the relationship established between the initial relative rotation number Nr0 and the driving signal S is described.

Theoretically speaking, in a generally structured synchromesh-type transmission, a fixed relationship exists between the initial relative rotation number Nr0 in a single synchronization, a synchronizing time duration $T_{SYN}$ between the initiation and the completion of the synchronization, and the sleeve load F which is the load applied to the sleeve 34 from the shift actuator 60. This is described, in great detail, with reference to FIGS. 13 and 14.

The total inertia moment of the gear A as one example of the target gear and the rotating member which rotates together with the gear A, the torque acting on the gear A about its axis resulting from friction between the gear A and the synchronizer ring 46, and the time are indicated by 'J', 'Q', and 't', respectively. The torque Q is represented by the following formula.

$Q=J(dNin/dt)a$

This formula can be expressed as $Qdt=JdNin$.

Figure 14:
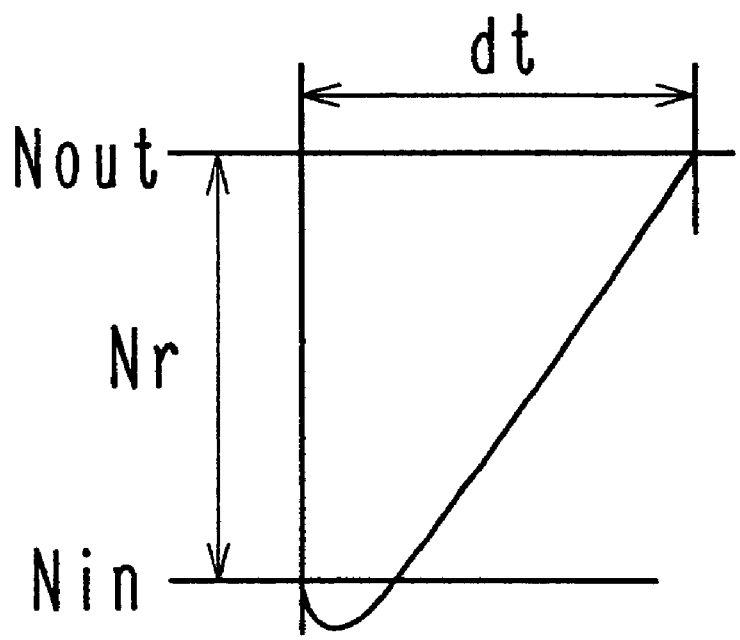
FIG. 14 is a graph representing how an input rotation number Nin and a relative rotation number Nr change with the passage of time.

Here, as shown in FIG. 14, it is possible to assume that in synchronization the input rotation number Nin increases in a substantially linear mode and ultimately reaches the rotation number (output rotation number) Nout of the output shaft 26. That is, first-order theory is available and in accordance with this assumption, the above formula can be converted into the following formula.

$Nro=Qdt/J$

On the other hand, with the inclination angle of the conical surface of the cone 42 relative to the rotation axis of the gear A and a representative radius of the friction surface between the gear A and the cone 42 which is measured from the rotation axis of the gear A being indicated by 'θ and 'r', respectively, the torque Q can be represented by the following formula.

$Q=(F/\sin\theta)r$

Using this formula, the foregoing formula can be rewritten as follows.

$Nro=(F/\sin\theta)rdt/J$

In addition, in accordance with the foregoing assumption (i.e., the first-order approximation theory), in the above formula, dt can be replaced with the synchronization time duration $T_{SYN}$. Thus, an introduction of a constant a which is free from or does not depend on any variables makes it possible to derive the following formula.

$Nro=\alpha FT_{SYN}$

Thus, it can be understood that between the initial relative rotation number Nro, the sleeve load F, and the synchronization time duration $T_{SYN}$, the initial relative rotation number Nro is proportional to the product of the sleeve load F and the synchronization time duration $T_{SYN}$. This results in that if the synchronization time duration $T_{SYN}$ is fixed to a target value, a 1:1 correspondence is established between the initial relative rotation number Nro and the sleeve load F. Moreover, a 1:1 correspondence is established between the sleeve load F and the driving signal S of the shift actuator 60.

On the basis of the above-mentioned facts, in this synchronization control routine, the appropriate driving signal $S^F$ is decided in accordance with a set relationship between the initial relative rotation number Nro and the driving signal S. In the described embodiment, the relationship between the initial relative rotation number Nro and the driving signal S is set on the basis of a target synchronization time duration $T_{SYN}^*$ which is set previously in a standard manner as an experiment, design, and/or emperical value.

Figure 15:
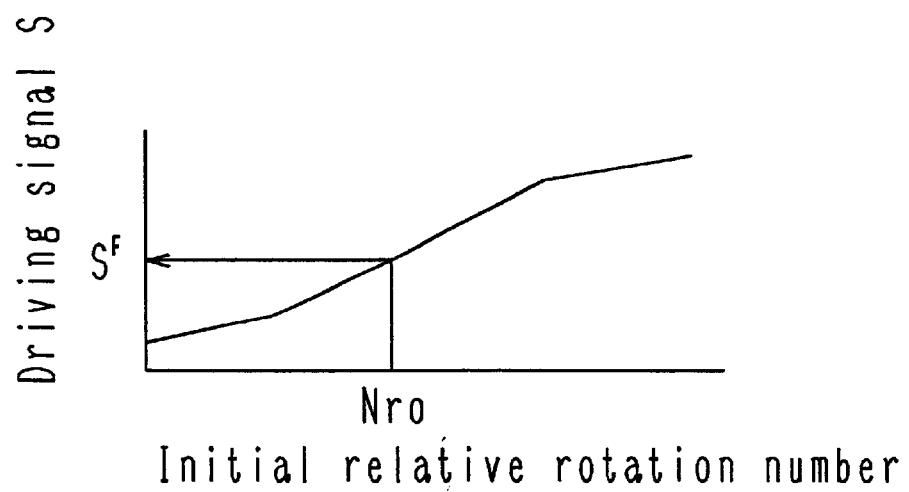
FIG. 15 is a graph representing the content of a driving signal determination signal map stored in a driving signal determination signal map storing area.

The relationship is represented as a driving signal decision map which is illustrated in FIG. 15. The target synchronization time duration $T_{SYN}$ is stored in the ROM 86.

The driving signal decision map is an updated version of an initial driving signal decision map and is obtained by executing the map correction program after the initial driving signal decision map is transferred to the driving signal decision map store region in the RAM 88. The initial driving signal decision map is also set previously based on experimental, design, and/or emperical values.

In the present embodiment, although the initial driving signal decision map is transferred from the ROM 86 to the RAM 88 whenever the vehicle begins to travel (for example, the power supply switch of the vehicle is turned on), such a transfer is not essential in practice. As an alternative, the present invention can be put into practice in such a manner that the computer 92 is made to have a ROM which is capable of being re-written electrically (i.e. EEPROM) as an example of re-writable nonvolatile memory and after completion of the assembly of the vehicle, whenever the vehicle terminates its travel (for example, which is indicative of turning on the power source switch of the vehicle), at-that-time stored driving signal decision map in the RAM 88 is stored in the foregoing EPROM and whenever the vehicle starts its travel (except for the first start) the latest driving signal decision map stored in the RAM 88 is read out for use. Such a concept makes it possible to effectively use the learning results in the latest vehicle travel as to the driving signal decision map in the next vehicle travel. As a result, from the beginning of each vehicle travel the driving signal decision map can be utilized with much higher precision.

Next, the content of this synchronization control routine is described. Whenever this synchronization control routine is executed, at step S351 in FIG. 8 a synchronization control flag is first set. When it is set, the synchronization control flag indicates a new initiation of the synchronization control and when it is reset, the synchronization control flag indicates non-initiation of the synchronization control. This synchronization control flag is stored in the flag region in the RAM 88 and is reset whenever the power source switch of the computer 92 is turned on.

Next, at step S352, the initial input rotation number Nino and the initial output rotation number Nout are obtained and are stored in the correction related data store region in the RAM 88. More specifically, first, at the present (i.e., at a new initiation of the synchronization control), the input rotation number sensor 102 and the output rotation number sensor 104 determine the input rotation number Nin (in narrow sense) and the output rotation number Nout (in narrow sense), respectively. Next, a reduced value of the determined value of the input rotation number Nin (in narrow sense) is obtained in such a manner that the reduced value is a product of the determined value and all the gear ratios until the target idle gear in the transmission 14. The reduced value of the determined value of the input rotation number Nin (in narrow sense) and the determined value of the output rotation number Nout (in narrow sense) are obtained and stored as the initial input rotation number Nin0 and the initial output rotation number Nout0 in the RAM 88. Subsequently, at step S353, the initial relative rotation number Nro is calculated on the basis of the initial input rotation number Nin0 and the initial output rotation number Nout0, and the resultant value is stored in the correction related data store region in the RAM 88.

The initial relative rotation number Nro can also be obtained by way of other methods. For example, it is possible to obtain the initial relative rotation number Nr0 by substituting the determined value of the engine rotation number sensor which determines the rotation number of the engine 10 for the determined value of the input rotation number sensor 102. This is in view of the fact that while the clutch 12 is being engaged, the rotation number of the engine 10 and the input rotation number Nin (in narrow sense) are in coincidence with each other.

Furthermore, it is possible to obtain the initial relative rotation number Nr0 by substituting the determined value of the engine rotation number sensor which determines the rotation number of the engine 10 for the determined values of the output rotation number sensor 104 as well as the input rotation number sensor 102. This is in view of the fact that while the clutch 12 is being engaged the rotation number of the engine 10 makes it possible to provide the output rotation number Nout (in narrow sense) in addition to the input rotation number Nin (in narrow sense).

When the initial relative rotation number Nr0 is calculated in accordance with the above-mentioned manner, at step S354, using the driving signal decision map (FIG. 15) stored in the RAM 88, the driving signal S which corresponds to the determined value of the initial relative rotation number Nr0 is decided to be the appropriate driving signal $S^F$.

Accurately speaking, the driving signal decision map defines a relationship between a plurality of representative values (discrete values) of the initial relative rotation number Nr0 and a plurality of driving signals S (discrete values). If a new initial relative rotation number Nr0 is in coincidence with one of the plural representative values, one of the driving signals S corresponding to the resultant initial relative rotation number Nr0 is decided to be the appropriate driving signal $S^F$. On the other hand, if the new initial relative rotation number Nr0 is not in coincidence with one of the plural representative values, the appropriate driving signal $S^F$ is decided by interpolating linearly within a range between two representative values which are most close to the new initial relative rotation number.

Thereafter, at step S355, the decided appropriate driving signal $S^F$ is outputted to the shift actuator 60. Subsequently, at step S356, both an at-present actual input rotation number $Nin^A$ and an at-present actual output rotation number $Nout^A$ are obtained. Like the initial input rotation number Nin0 and the initial output rotation number Nout0, the actual input rotation number $Nin^A$ and the actual output rotation number $Nout^A$ are obtained on the basis of the output signals from the input rotation number sensor 102 and the output rotation number sensor 104, respectively.

Thereafter, at step S357, a current relative rotation number Nr is calculated by a subtraction between the obtained value of the actual input rotation number $Nin^A$ and the obtained value of the actual output rotation number $Nout^A$ and it is checked whether or not the absolute value of the resultant current relative rotation number Nr is less than a threshold value $N_{rth}$. That is to say, a judgment is made whether or not the synchronization is substantially completed. The threshold value $N_{rth}$ is a value of almost zero and is stored in the ROM 86.

If the absolute value of the relative rotation number Nr is not less than the threshold value $N_{rth}$, the result of step S357 is NO and the program goes back to step S355. During execution of steps S355 to S357 in a repetitious fashion, if the absolute value of the relative rotation number Nr is found to be less than the threshold value $N_{rth}$, the result of step S357 is YES which is indicative of termination of the current synchronization control, resulting in termination of the current execution of this synchronization control routine.

Figure 7:
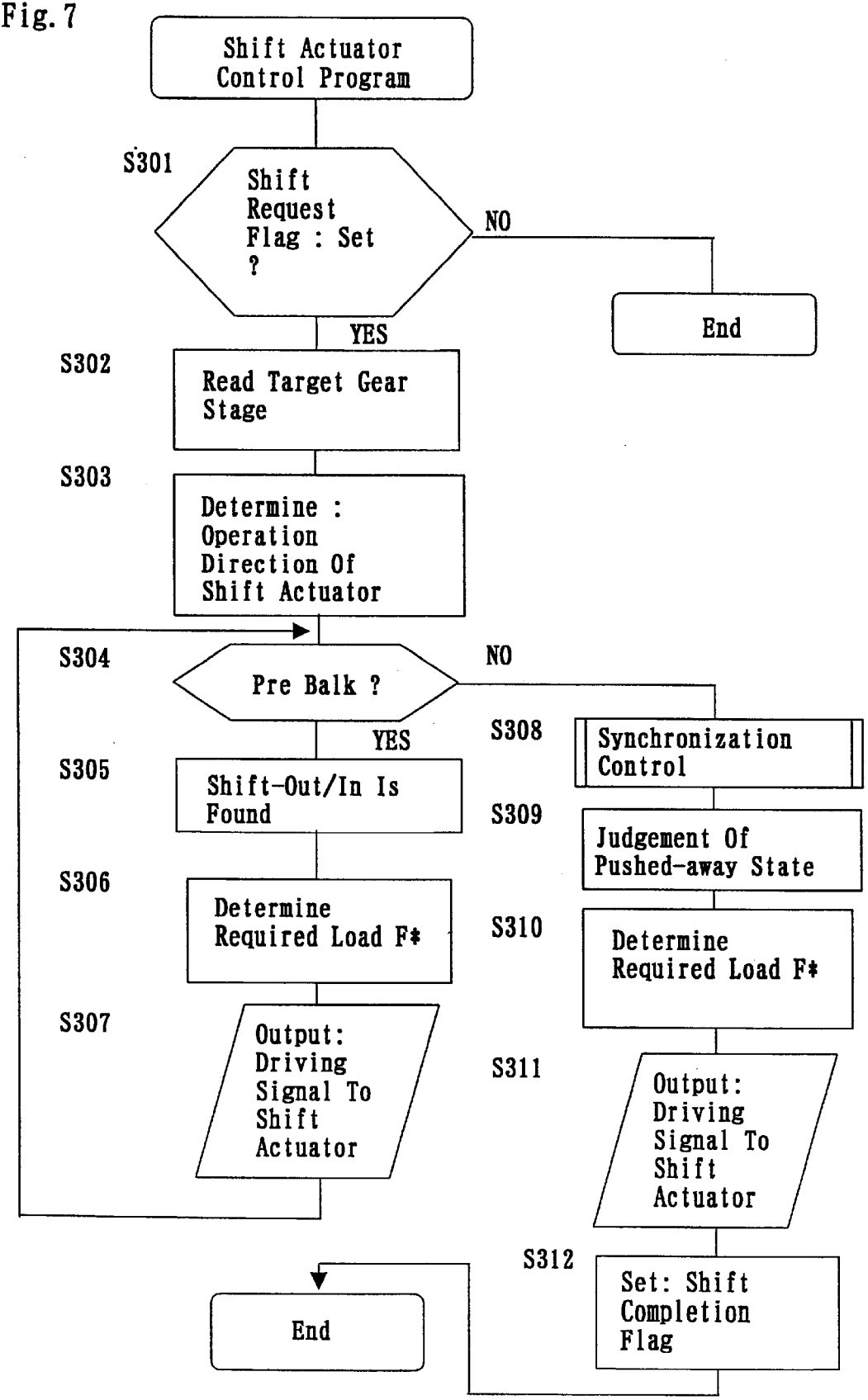
FIG. 7 is a flow chart of a shift actuator control program executed in the ECU shown in FIG. 4.

Thereafter, at step S309 in FIG. 7, the sleeve 34 is judged to be in the push-away state at present. That is to say, upon synchronization between the sleeve 34 and the target gear the teeth of the clutch 38 of the sleeve 34 are judged to be in advancement with the teeth of the synchronizer ring 46 and the teeth of the clutch 48 of the target idle gear are pushed away. Subsequently, at step S310, the required load F* which is required to be applied to the sleeve 34 is decided so that its magnitude is suitable for the pushing-away advancing movement of the sleeve 34.

Thereafter, at step S311, a driving signal is issued to the shift actuator 60 to move the sleeve 34 in the direction decided at step S303 and to realize the required load F* decided at step S310. Then, at step S312, a shift completion flag is set. When it is set, this shift completion flag indicates a completion of the current shift control, and when it is reset indicates an incompletion of the current shift control. This shift completion flag also is prepared in the flag region in the RAM 88 so as to be reset whenever the power source of the computer 92 is turned on. At this stage, one execution of the shift actuator control program is terminated.

Figure 9:
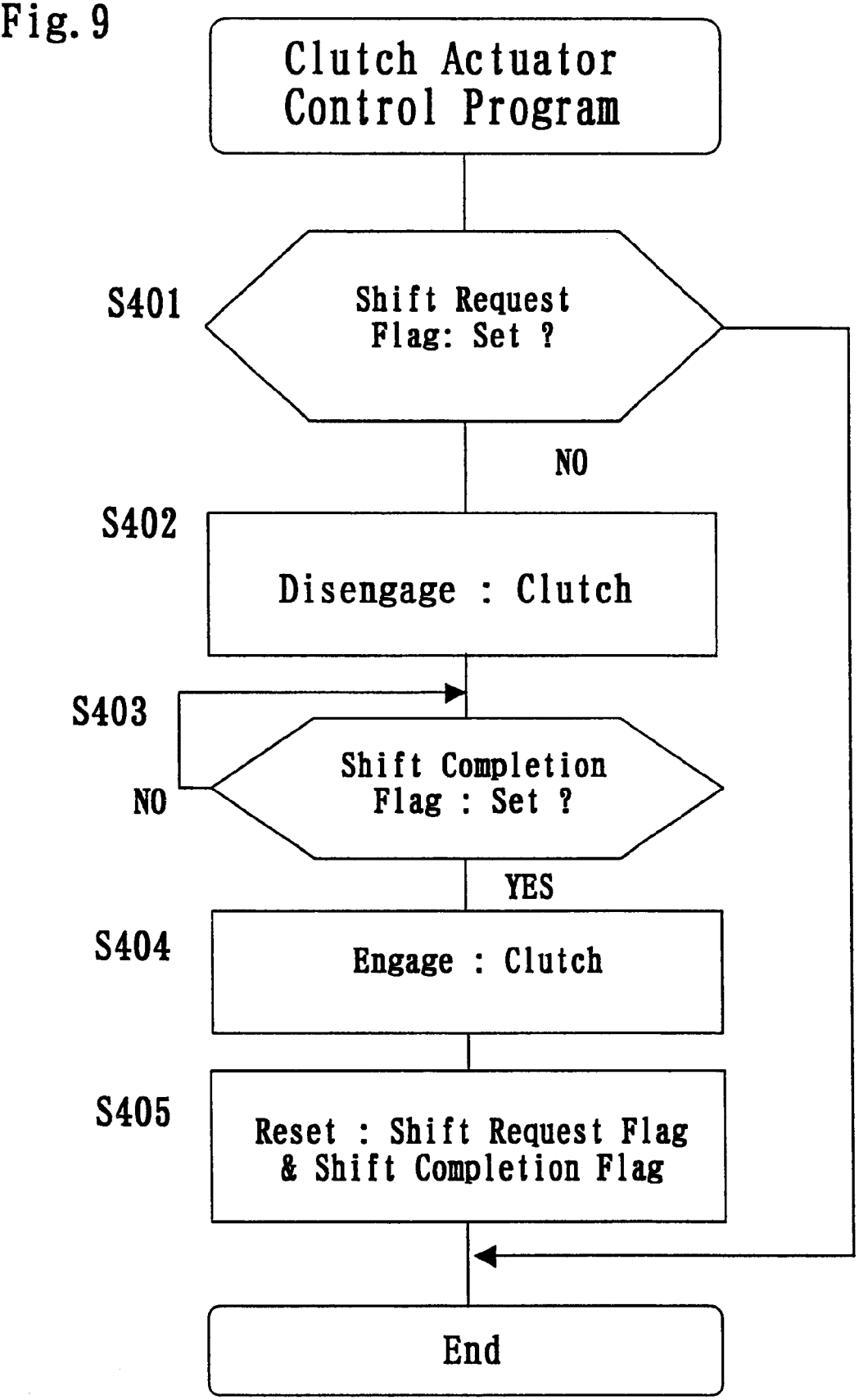
FIG. 9 is a flow chart of a clutch actuator control program executed in the ECU shown in FIG. 4.

Like the foregoing programs, the actuator control program depicted in FIG. 9 is also executed in a repetitious manner. During each execution, it is determined at step S401 whether or not the shift request flag is set. If the shift request flag is not set, the result at step S401 is NO, and immediately one cycle execution of this program terminates.

On the other hand, if the shift request flag is set, the decision result at step S401 is YES and the program proceeds to step S402. At this step, a driving signal is outputted to the clutch actuator 80 which is required for switching the clutch 12 from the engaged state to the disengaged state. Thereafter, a determination is made at step S403 whether a shift completion flag is set in the RAM 88. If the shift completion flag is set, the program proceeds to step S404 where a driving signal is outputted to the clutch actuator 80 for switching the clutch 12 from the disengaged state to the engaged state. Then, at step S405, in the flag region of the RAM 88, the shift request flag and the shift completion flag are reset. At this stage, one execution cycle of this clutch actuator control program is terminated.

Next, the content of the map correction program is described with reference to FIG. 10. Describing initially the content of this map correction program, prior to each synchronization control, this map correction program corrects or amends the foregoing driving signal decision map on the basis of an input rotation number deviation ΔNin which is a deviation of the actual input rotation number $Nin^A$ at each cycle of the latest synchronization control from the target input rotation number Nin* at the same cycle.

Figure 16:
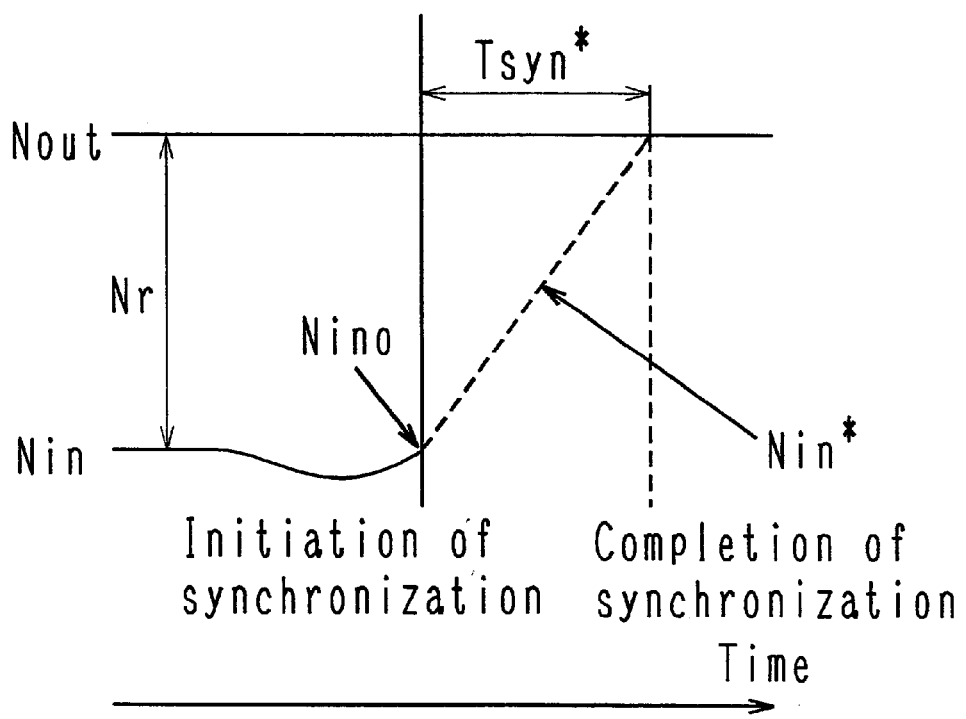
FIG. 16 is a graph explaining the content of the map correction program shown in FIG. 10.

In the present embodiment, as the graph shown in FIG. 16 illustrates, upon completion of the synchronization control during which the input rotation number Nin increases from the initial input rotation number Nin0 in a linear mode (i.e., when the target synchronization time duration $T_{SYN*}$ elapses from the initiation of the synchronization), the input rotation number Nin is assumed to reach the initial output rotation number Nout0 (i.e., the rotation number of the output shaft 26 which is assumed to rotate at a constant speed).

Moreover, in this map correction program, the driving signal decision map is performed in such a manner that the appropriate driving signal $S^F$ based on the corrected driving signal decision map causes the actual synchronization time duration $T_{SYN}^A$ in the next synchronization control to approach the target synchronization time duration Ts on the basis of plural data ("input rotation number deviation related data") indicating plural variables related to the input rotation number deviation ΔNin in the latest synchronization control.

Here, the input rotation number deviation related data is described. In this map correction program, the following four variables are used as the input rotation number deviation related data.

(i) input rotation number deviation summation ΣΔ Nin.
(ii) synchronization time duration deviation $\Delta T_{SYN}$.
(iii) elapse-time input rotation number deviation $\Delta Nin^P$.
(iv) change grade deviation ΔdNin.

Figure 17:
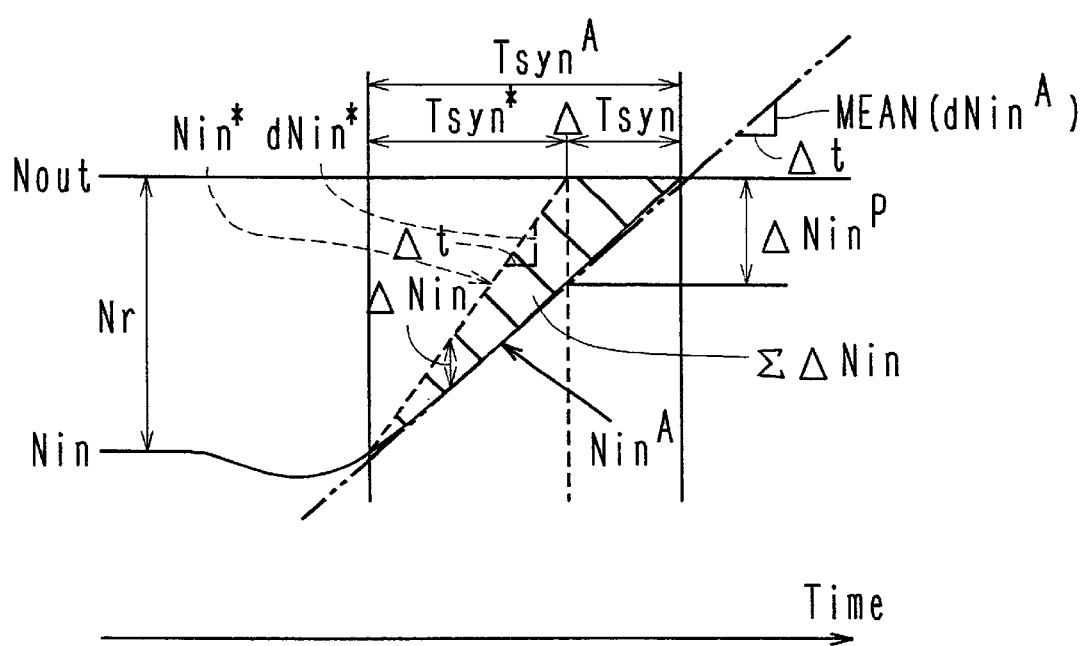
FIG. 17 is another graph explaining the content of the map correction program shown in FIG. 10.

In FIG. 17, these four variables are graphically explained.

(i) input rotation number deviation summation ΣΔ Nin is a summation of the input rotation number deviations Δ Nin in the latest synchronization control. This input rotation number deviation summation ΣΔ Nin corresponds to the cross-hatched area in the graph in FIG. 17.

(ii) synchronization time duration deviation $\Delta T_{SYN}$ is a deviation of the actual synchronization time duration $T_{SYN}^{A'}$ in the latest synchronization control from the target synchronization time duration $T_{SYN*}$. The reason why this synchronization time duration deviation $\Delta T_{SYN}$ is considered is that whether the actual synchronization time duration $T_{SYN}^A$ is shorter or longer than the target synchronization time duration $T_{SYN*}$ indicates whether the input rotation number deviations Δ Nin becomes zero earlier or later than the designed time.

(iii) elapse-time input rotation number deviation $\Delta Nin^P$ is the input rotation number deviation Δ Nin substantially at a time corresponding to the time when the target synchronization time duration $T_{SYN*}$ elapses in the latest synchronization control.

(iv) change grade deviation ΔdNin is a deviation of an actual change grade average value MEAN ($dNin^A$) from a change grade (target change grade) dNin of the target input rotation number Nin, the actual change grade average value MEAN ($dNin^A$) being an average value of change grades (actual change grades) of the actual input rotation number $Nin^A$ in the latest synchronization control.

The approaching of each of these four variables to zero means that in the synchronizing control the actual synchronizing time duration $T_{SYN}$ approaches the target synchronizing time duration $T_{SYN*}$.

Thus, the map correction program obtains four variables in the latest synchronization control and on the basis of the resultant values corrects the driving signal decision map in such a manner that the four variables to be obtained in the next synchronization control approach zero respectively.

The correction of the driving signal decision map using the input rotation number deviation related data is described in greater detail. First, in this map correction program, on the basis of the four variables obtained in the latest synchronization control, four kinds of temporal correction coefficients $C^T$ are decided. Moreover, in this map correction program, on the basis of these temporal correction coefficients CT, an ultimate correction coefficient $C^F$ is obtained. Based on this ultimate correction coefficient $C^F$, the driving signal decision map is corrected.

Figure 10:
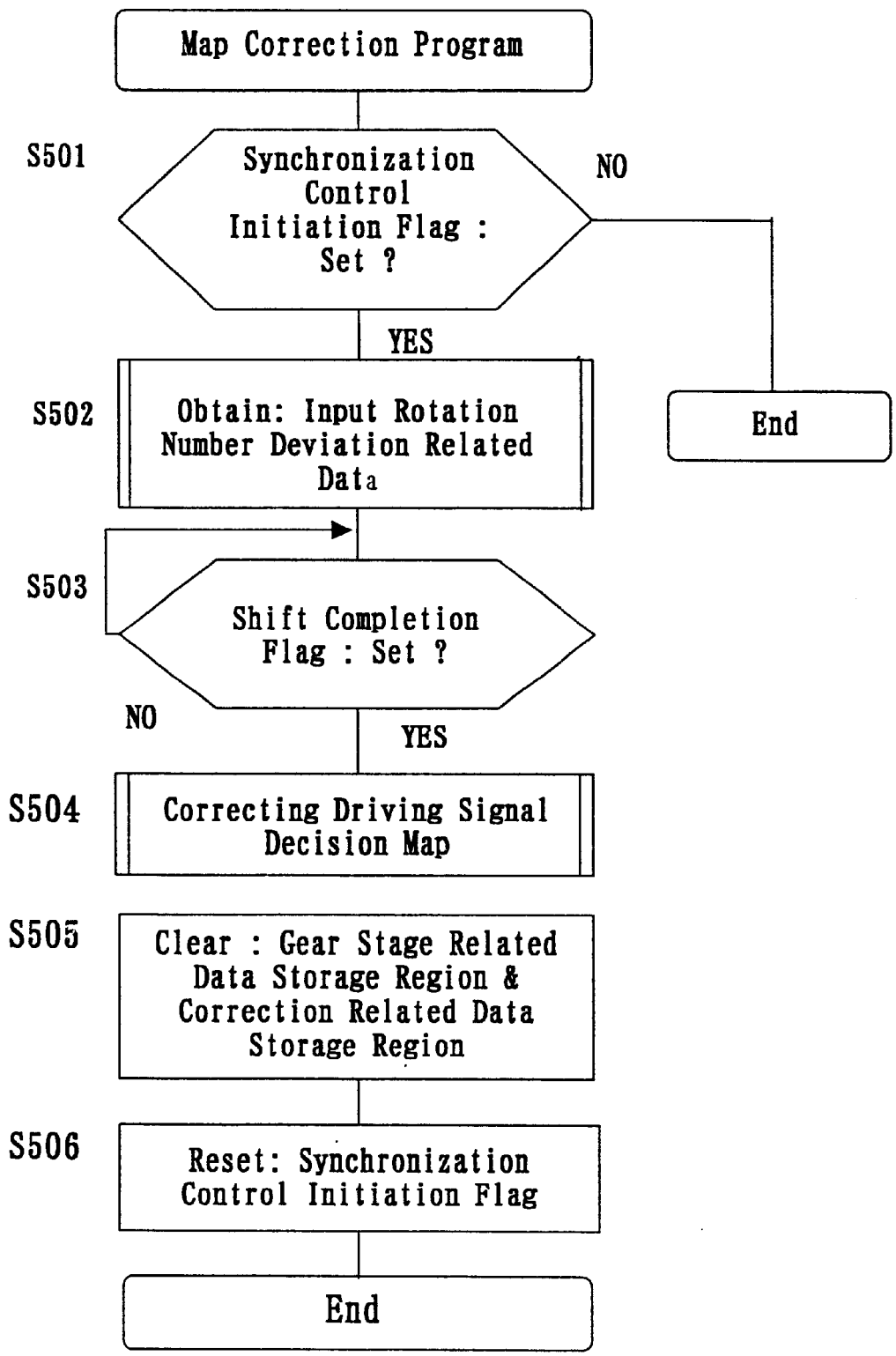
FIG. 10 is a flow chart of a map correction program executed in the ECU shown in FIG. 4.

The content of this map correction program shown in FIG. 10 is as follows. Like the foregoing programs, this map correction program is executed in a repetitious fashion. In each execution of this map correction program, at step S501 in FIG. 10, it is checked whether or not a synchronization control flag is set. That is to say, it is checked whether or not the synchronization control is initiated by the foregoing synchronization control routine. If the synchronization control flag is not set, the result in step S501 is NO and immediately one cycle of the execution of the map correction program is completed. If the synchronization control flag is set, the result in step S501 is YES and the program proceeds to step S502. At this step, the input rotation number deviation related data is obtained.

The detailed content of step S502, as an input rotation number deviation related data obtaining routine, is illustrated in the flowchart in FIG. 11. In this input rotation number deviation related data obtaining routine, an elapsed time t is reset to zero at step S551. Next, at step S552, on the basis of the initial input rotation number Nin0 stored in the RAM 88, the initial output rotation number Nout0 stored in the RAM 88, and the target synchronization time duration $T_{SYN*}$ stored in the ROM 86, a target input rotation number obtaining function is decided and the resultant target input rotation number obtaining function is stored in the correction related data store region of the RAM 88.

Here, the target input rotation number obtaining function is explained in greater detail. When a time range or duration defined by the elapsed time t reaches the target synchronization time duration $T_{SYN*}$, a first-order function which defines a straight line, as indicated by the dotted line in FIG. 16, is decided to be the target input rotation number obtaining function. This straight line is constituted by connecting the initial input rotation number Nin0 and a value (which is in coincidence with the initial output rotation number Nout0 in the present embodiment as mentioned above) which the input rotation number Nin0 should reach at a scheduled synchronization complete time (i.e., after elapse of the target time duration $T_{SYN*}$ measured from the synchronization initiation). On the other hand, after the elapsed time t goes beyond the target synchronization time duration $T_{SYN*}$, regardless of the elapsed time t, a function which outputs the initial output rotation number Nout0 is decided to be the target input rotation number obtaining function. Substituting an actual value of the elapsed time t into the above target input rotation number obtaining function outputs the target input rotation number Nin* which is to be realized at the actual elapsed time t.

Thereafter, at step S553 in FIG. 11, the initial input rotation number Nin0 stored in the RAM 88 is read and is regarded as the latest value of the actual input rotation number $Nin^A$. Subsequently, at step S554, a delay is made for a set time duration Δt. Then, at step S555, the elapsed time t is updated by being added with the set time duration Δt (a new elapsed time t is established by adding the set time duration Δ t to the current elapsed time t).

Figure 8:
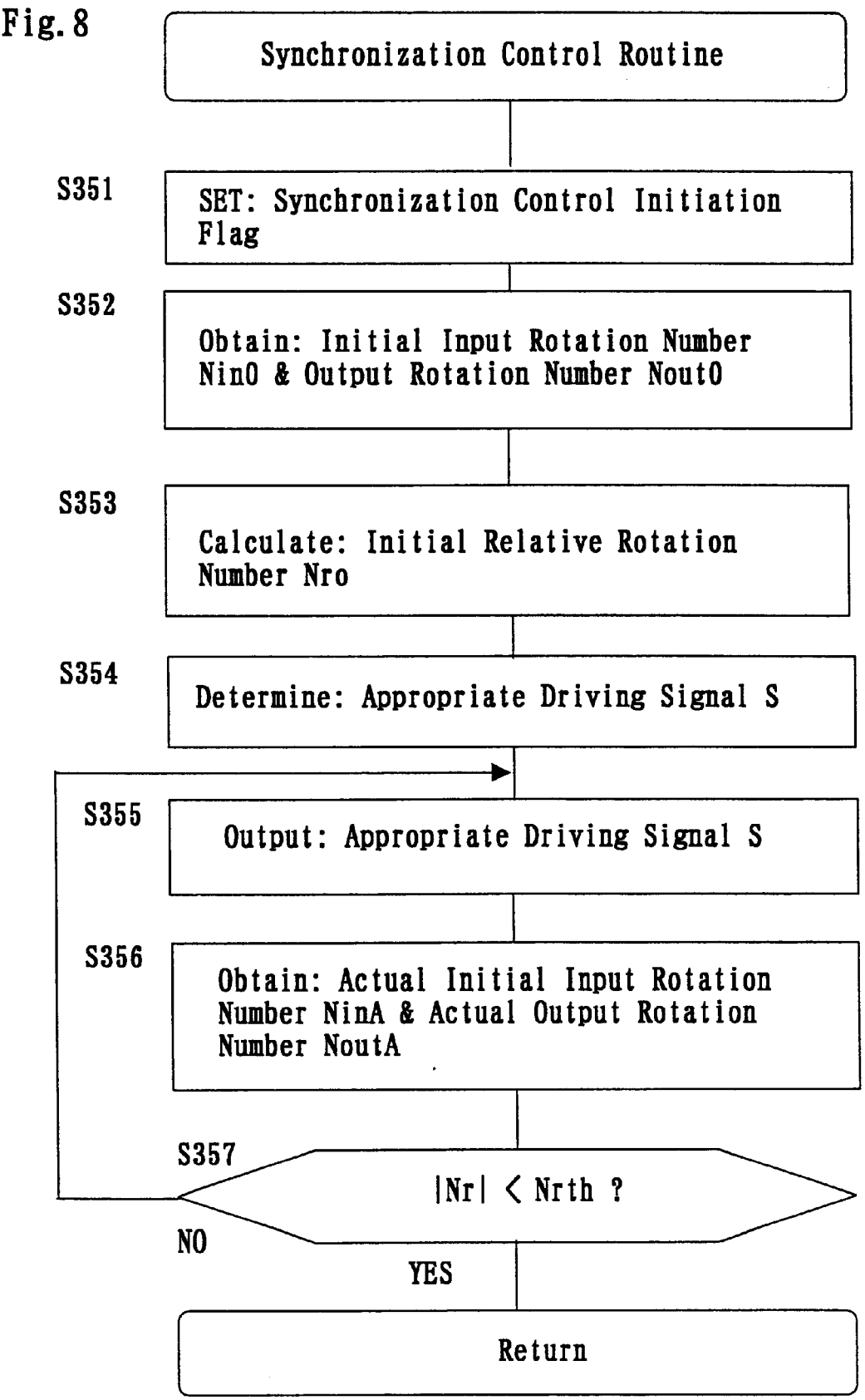
FIG. 8 is a flow chart of a synchronizing control routine carried out in step S308 of the shift actuator control program shown in FIG. 7.

Subsequently, at step S556, the at-present or current actual input rotation number $Nin^A$ and the at-present or current actual output rotation number $Nout^A$ are obtained similar to the processing at step S356 in FIG. 8 in the synchronize control routine.

Thereafter, at step S557, the target input rotation number Nin* which is to be realized at present can be obtained by substituting the current elapsed time t into the target input rotation number obtaining function stored in the RAM 88. Subsequently, an input rotation number deviation ΔNin is calculated as a deviation between the actual input rotation number $Nin^A$ obtained at step S556 and the target input rotation number Nin* obtained at step S557. Additionally at this step, the resultant input rotation number deviation ΔNin is related to the current elapsed time t to be stored in the correction related data region of the RAM 88.

Subsequently, at step S559, the actual input rotation number $Nin^A$ obtained at step S556 is made the latest actual input rotation number $Nin^A$ and the program goes to step S560. At step S560, an actual change grade $dNin^A$ (i.e. a change rate of the actual input rotation number $Nin^A$ per the set time duration Δt) is calculated by a subtraction between the current actual input rotation number $Nin^A$ and the latest actual input rotation number $Nin^A$. At this step, moreover, the resultant actual change grade $dNin^A$ is related to the current elapsed time t to be stored in the correction related data region of the RAM 88.

Thereafter, at step S561, as a relative rotation number Nr, the difference between the actual input rotation number $Nin^A$ and the actual output rotation number $Nout^A$ both of which are obtained at step S556 is determined, and it is checked whether or not an absolute value of the resulting relative rotation number Nr is less than a threshold value Nrth. Briefly stated, it is determined whether or not the synchronization is perfectly completed. It is to be noted that the threshold value Nrth is identical with that used in the synchronization control routine.

If the absolute value of the resultant relative rotation number Nr is not less than the threshold value Nrth, the result at step S561 is NO and the program goes to step S562. At this step, for the next execution, the current actual input rotation number $Nin^A$ is made the new latest actual input rotation number $Nin^A$. Then, the program goes back to step S554.

If the absolute value of the resultant relative rotation number Nr is found to be less than the threshold value Nrth during executions of steps S554 through S562 in a repetitious manner, the result of the determination in step S561 is YES and the program goes to step S563. At this step, the current elapsed time t is obtained and the resultant elapsed time t is decided to be the actual synchronization time duration $T_{SYN}^A$. In addition, at this step, the resultant actual synchronization time duration $T_{SYN}^A$ is stored in the correction related data store region of the RAM 88. At this stage, the current execution of this input rotation number deviation related data obtaining routine is terminated.

Thereafter, at step S503 in FIG. 10, a determination is made concerning whether the shift completion flag in the RAM 88 is set. Thus, upon completion of one cycle of the shift actuator control program subsequent, steps are executed. If the shift completion flag in the RAM 88 is set, at step S504 a correction is made on the current driving signal decision map stored in the RAM 88.

Figure 13:
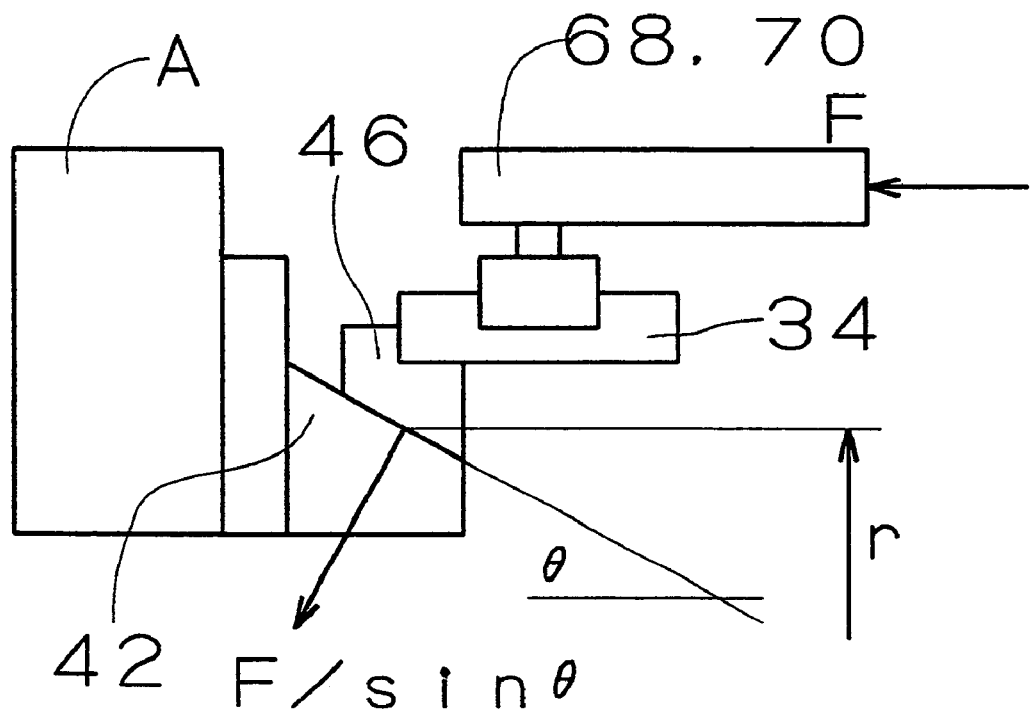
FIG. 13 is a partial cross-sectional view of the synchromesh mechanism shown in FIG. 2 conceptually explaining its principle.

The detailed content of step S504 is illustrated conceptually in the flowchart of FIG. 13 as a correction processing routine. In this correction processing routine, at step S601 the plural input rotation number deviation ΔNin (obtained in the latest synchronization control) are read for purposes of being summed as an input rotation number deviation ΣΔNin.

Next, at step S602, on the basis of the resultant input and the resultant input rotation number deviation ΣΔNin, a first temporal correction coefficient $C^T1$ which is used for correcting the current driving signal decision map is determined. This first temporal correction coefficient $C^T1$ is used in order that an input rotation number deviation ΣΔNin which is to be obtained in the next synchronization control approaches zero by an appropriate driving signal $S^F$ based on the newly corrected driving signal decision map. The first temporal correction coefficient $C^T1$ is decided by utilizing the relationship between the input rotation number deviation ΣΔNin and the first temporal correction coefficient $C^T1$ which is stored in the ROM 86 based on experimental, design, and/or empirical values.

Subsequently, at S603, the actual synchronization time duration $T_{SYN}^A$ (obtained in the latest synchronization control) stored in the RAM 88 and the target synchronization time duration $T_{SYN}^*$ stored in the ROM 86 are read and a difference therebetween is calculated as a synchronization time duration deviation $\Delta T_{SYN}$.

Thereafter, at step S604, on the basis of the resultant synchronization time duration deviation $\Delta T_{SYN}$, a second temporal correction coefficient $C^T 2$ for correcting the current driving signal decision map is decided. Similar to the first temporal correction coefficient $C^T 1$, this second temporal correction coefficient $C^T 2$ is used for approaching a synchronization time duration deviation $\Delta T_{SYN}$ which is to be obtained in the next synchronization control to zero by an appropriate driving signal $S^F$ on the basis of the newly corrected driving signal decision map. Similar to the first temporal correction coefficient CT1, the second temporal correction coefficient $C^T 2$ is decided by utilizing the relationship between the synchronization time duration deviation $\Delta T_{SYN}$ and the second temporal correction coefficient $C^T 2$ which is stored in the ROM 86 as an experimental, design, and/or empirical value.

Subsequently, at step S605, as an elapsed time input rotation number deviation $\Delta \text{Nin}^P$, one of the plurality of input rotation number deviations $\Delta \text{Nin}$ is obtained which is stored in the RAM 88 and which is related to the elapsed time t which is substantially equal to the target synchronization time duration $\Delta T_{SYN}*$ stored in the ROM 86.

Thereafter, at step S606, on the basis of the resultant elapsed time input rotation number deviation $\Delta \text{Nin}^P$, a third temporal correction coefficient $C^T 3$ for correcting the current driving signal decision map is decided. Similar to the first temporal correction coefficient $C^T 1$, this third temporal correction coefficient $C^T 3$ is used to make an elapsed time input rotation number deviation $\Delta \text{Nin}^P$, which is to be obtained in the next synchronization control, approach zero by the appropriate driving signal $S^F$ on the basis of the newly corrected driving signal decision map. Similar to the first temporal correction coefficient $C^T 1$, the third temporal correction coefficient $C^T 3$ is decided by utilizing the relationship between the elapsed time input rotation number $\Delta \text{Nin}^P$ and the third temporal correction coefficient $C^T 3$ which is stored in the ROM 86 as an experimental, design, and/or empirical value.

Subsequently, at step S607, the plural actual change grade $\text{dNin}^A$ stored in the RAM 88 (which are stored in the latest synchronization control) are read out and as an average value thereof, the actual change grade average value MEAN ($\text{dNin}^A$) is calculated. Also at this step, by utilizing the target input rotation number obtaining function stored in the RAM 88, the target change grade dNin* is obtained which is a change rate of the target input rotation number Nin* per the set time duration $\Delta t$. In the present embodiment, as mentioned above, in the target input rotation number obtaining function, a portion which corresponds to the time duration area at which the elapsed time t approaches the target synchronization time duration $T_{SYN}*$ is represented by a first-order function of the elapsed time t and the target input rotation number Nin* (FIG. 16). Thus, obtaining the grade or inclination of the first-order function makes it possible to obtain the target change grade dNin*. Moreover, in this step, a difference between the resultant actual change grade average value MEAN ($\text{dNin}^A$) and the target change grade dNin* is calculated as a change grade deviation $\Delta \text{dNin}$.

Thereafter, at step S608, on the basis of the resultant change grade deviation $\Delta \text{dNin}$, a fourth temporal correction coefficient $C^T 4$ for correcting the current driving signal decision map is decided. Similar to the first temporal correction coefficient $C^T 1$, this fourth temporal correction coefficient CT4 is used for approaching the change grade deviation $\Delta \text{dNin}$ which is to be obtained in the next synchronization control to zero by the appropriate driving signal $S^F$ on the basis of the newly corrected driving signal decision map. Similar to the first temporal correction coefficient $C^T 1$, the fourth temporal correction coefficient $C^T 4$ is decided by utilizing the relationship between the change grade deviation $\Delta \text{dNin}$ and the fourth temporal correction coefficient $C^T 4$ which is stored in the ROM 86 as an experimental, design, and/or empirical value.

Subsequently, at step S609, a weighted average value of the temporal coefficients $C^T 1$, $C^T 2$, $C^T 3$, $C^T 4$ obtained at steps S602, S603, S604, S608 respectively is calculated. This weighted average value is calculated by summing a product of each of the temporal coefficients $C^T 1$, $C^T 2$, $C^T 3$, $C^T 4$ and a corresponding predetermined weight $\omega 1$, $\omega 2$, $\omega 3$, $\omega 4$. That is, this weighted average value=$\Sigma CTi\omega i$ (i=1, 2, 3, 4). The weights $\omega 1$, $\omega 2$, $\omega 3$, $\omega 4$ are values which satisfy the relationship $\Sigma \omega i=1$ (i=1, 2, 3, 4) and are stored in the ROM 86 as experimental, design, and/or empirical values. Moreover, in this step, the thus obtained weighted average value is decided to be an ultimate correction coefficient $C^F$ for correcting the current driving signal decision map.

In the present invention, although all four of the temporal correction coefficients $C^T 1$, $C^T 2$, $C^T 3$, $C^T 4$ are used for correcting the current driving signal decision map, such an operation is not essential. That is, the above correction can be established by using any one, any two, or any three of the four temporal correction coefficients $C^T 1$, $C^T 2$, $C^T 3$, $C^T 4$.

Subsequently, at step S610, the initial relative rotation number Nro stored in the RAM 88 is read out. Thereafter, at step S611, the current driving signal decision map stored in the RAM 88 is read out and is corrected on the basis of the ultimate correction coefficient $C^F$ decided at step S609.

Figure 18:
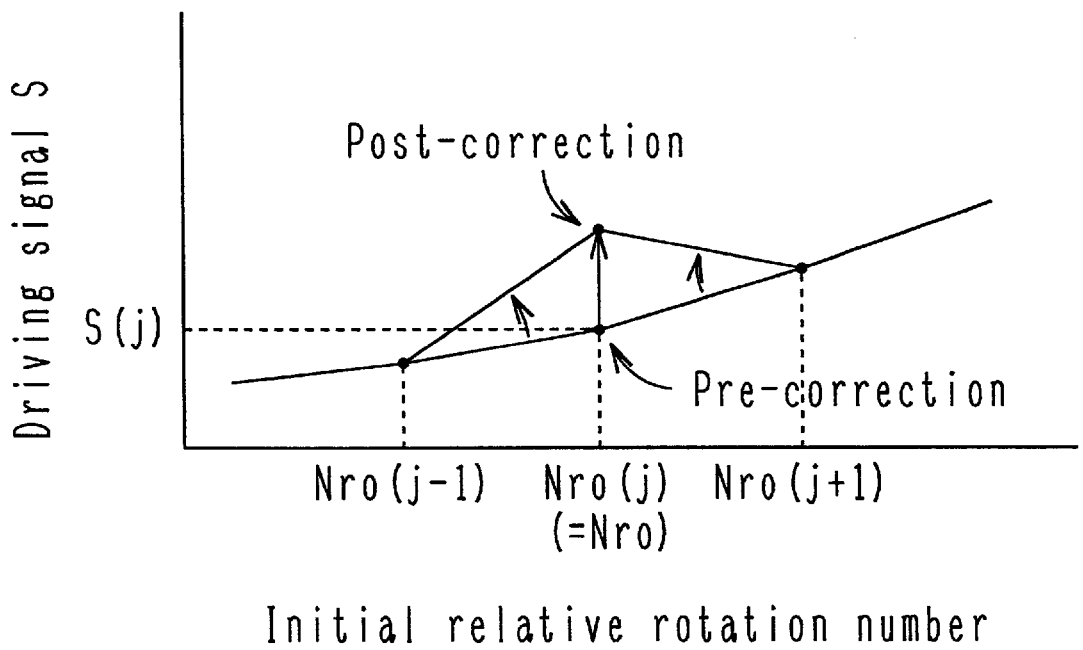
FIG. 18 is a graph detailing the content of step S611 in FIG. 12.

At step S611, if the read-out initial relative rotation number Nro at S610 is in coincidence with any one of the representative values assigned thereto in the current driving signal decision map as shown in FIG. 18, the value of a driving signal S(J) is corrected to correspond to the coincided representative value Nro(j).

Figure 19:
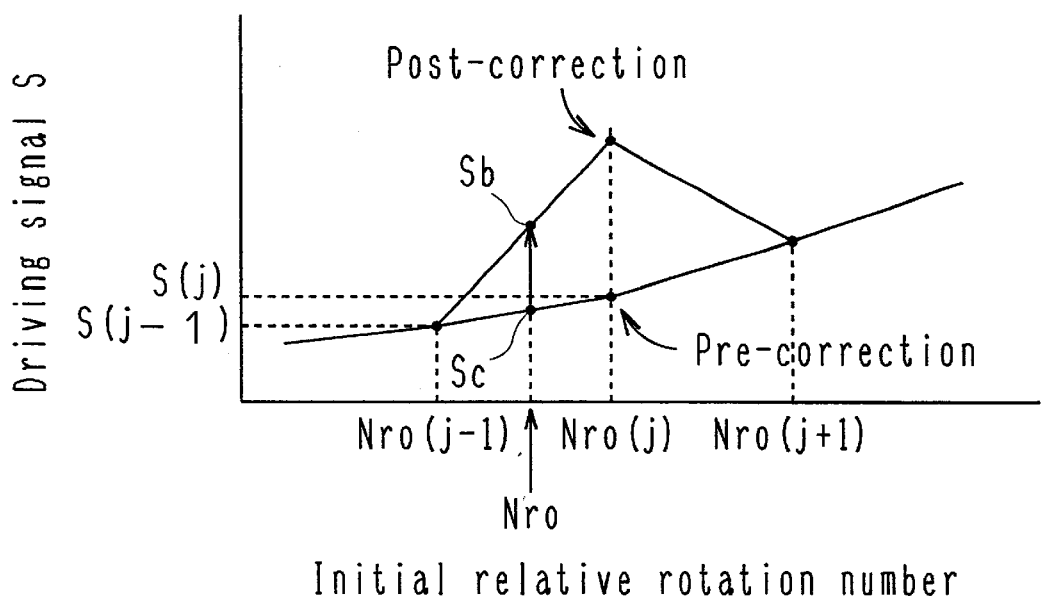
FIG. 19 is another graph detailing the content of step S611 in FIG. 12.

On the other hand, if the read-out initial relative rotation number Nro at step S610 is in coincidence with none of the representative values assigned thereto in the current driving signal decision map as shown in FIG. 19, a representative value Nro(j) which is the most proximate to the read-out initial relative rotation number Nro, a driving signal S(j) corresponding to the most proximate representative value N-ro(j), another representative value Nro(j-1) which is the next proximate to the read-out initial relative rotation number Nro, and a driving signal S(j-1) corresponding to the next proximate representative value Nro(j-1) are focused. In addition, in the current driving signal decision map, the value of the driving signal Sc relative to the initial relative rotation number Nr0 is corrected by the ultimate correction coefficient $C^F$ and the resultant value is used as a reference driving signal Sb. Moreover, the correction of the driving signal S(j) is made in such a manner that the reference driving signal Sb is placed on a straight line connecting the corrected driving signal S(j) and the non-corrected driving signal S(j-1).

Furthermore, at this step, depending on the correction result, the driving signal decision map is updated. At this stage, the execution of the current cycle of this correction processing routine is terminated.

Thereafter, at step S505 in FIG. 10, the gear stage related data store region and the correction related data store region which are provided in the RAM 88 are cleared. Subsequently, at step S506, the synchronization control initiation flag is reset. At this stage, the execution of the current cycle of the correction program is terminated and in the next synchronization control a new appropriate driving signal $S^F$ is decided on the basis of the above-updated driving signal decision map.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shifting device associated with a synchromesh-type transmission for changing a gear ratio of the transmission which transmits rotation from a power source to driving wheels, the transmission including a synchromesh mechanism having a plurality of constantly meshed gear pairs possessing different gear ratios, one of the gear pairs being selected as an effective gear pair, the synchromesh mechanism having a sleeve and a synchronizer ring, with the sleeve being mounted on a shaft on which one of each of the gear pairs is mounted as an idle gear, the sleeve being rotatable together with the shaft and being movable in an axial direction of the shaft, the synchronizer ring being rotatable and movable relative to the idle gear, the synchromesh mechanism being brought into operation to establish synchronization between the idle gear and the sleeve in such a manner that the sleeve is moved in the axial direction to be engaged with the synchronizer ring and subsequently the engaged synchronizing ring is urged onto a friction surface of the idle gear so as to be rotatable together with the idle gear, the shifting device comprising:
an electrically controlled actuator generating a load for acting on the sleeve to move in the axial direction in response to a driving signal;
a control device outputting the driving signal to the actuator, upon current synchronization control, to change the gear-ratio of the transmission on the basis of at least one of a vehicular driver's intention, a state of the vehicle, and a state of the transmission;
the control device including driving signal determination means for determining the driving signal on the basis of an initial relative rotation number and a relative rotation number deviation;
the initial relative rotation number being defined as a relative rotation between the idle gear and the sleeve at an initiation of the current synchronization control;
the relative rotation number deviation being a deviation between a target relative rotation number and an actually detected relative rotation number;
the target relative rotation number being between the idle gear and the sleeve at the last synchronization control; and
the actually detected relative rotation number being between the idle gear and the sleeve at the last synchronization control;
wherein the relative rotation number deviation is defined by at least one of an overall value of the relative rotation number deviation in the last synchronization control, a synchronization time duration deviation between an actual synchronization time duration ranging from initiation to completion of the last synchronization and a target synchronization time duration, an elapsed time relative rotation number deviation as an actual relative rotation number which is to be zero when the target synchronization time duration elapsed in the last synchronization control, and a change gradient deviation between an actual relative rotation number change gradient in the last synchronization control and a target relative rotation number change gradient.

2. The shifting device as set forth in claim 1, wherein the driving signal determination means has:

a signal determining portion which determines the driving signal corresponding to an actual initial relative rotation number at each synchronization control pursuant to a relationship between the initial relative rotation number and the driving signal; and a relation-correcting portion performing a correction, on the basis of the relative rotation number deviation at the last synchronization control, prior to the current synchronization control in such a manner that a resultant makes an actual synchronization time duration between initiation and termination of the current synchronization control operation much closer to a target synchronization time duration.

3. The shifting device as set forth in claim 2, wherein the relation-correcting portion affects a correction in such a manner that at least one of the overall value, the synchronization time duration deviation, the elapsed time relative rotation number deviation, and the change gradient deviation is made close to zero.

4. The shifting device as set forth in claim 3, wherein the relation-correcting portion affects a correction on the basis of at least two of the overall value, the synchronization time duration deviation, the elapsed time relative rotation number deviation, and the change gradient deviation.

5. The shifting device as set forth in claim 4, wherein the relation-correcting portion effects a correction, prior to initiation of a new synchronization control, on the basis of the relative rotation number deviation and an actual driving signal in the last synchronization control.

6. The shifting device as set forth in claim 5, wherein the shaft is operatively connected to the driving wheels, the other of the gear pairs is operatively connected as a non-idle gear to the power source, and the initial relative rotation number is determined to be a rotation number of the idle gear.

7. The shifting device as set forth in claim 4, wherein the shaft is operatively connected to the driving wheels, the other of the gear pairs is operatively connected as a non-idle gear to the power source, and the initial relative rotation number is determined to be a rotation number of the idle gear.

8. The shifting device as set forth in claim 3, wherein the relation-correcting portion effects a correction, prior to initiation of a new synchronization control, on the basis of the relative rotation number deviation and an actual driving signal in the last synchronization control.

9. The shifting device as set forth in claim 3, wherein the shaft is operatively connected to the driving wheels, the other of the gear pairs is operatively connected as a non-idle gear to the power source and the initial relative rotation number is determined to be a rotation number of the idle gear.

10. The shifting device as set forth in claim 2, wherein the relation-correcting portion effects a correction, prior to initiation of a new synchronization control, on the basis of the relative rotation number deviation and an actual driving signal in the last synchronization control.

11. The shifting device as set forth in claim 2, wherein the shaft is operatively connected to the driving wheels, the other of the gear pairs is operatively connected as a non-idle gear to the power source and the initial relative rotation number is determined to be a rotation number of the idle gear.

12. The shifting device as set forth in claim 1, wherein the shaft is operatively connected to the driving wheels, the other of the gear pairs is operatively connected as a non-idle gear to the power source, and the initial relative rotation number is determined to be a rotation number of the idle gear.

* * * * *